United States Patent
Zhang et al.

(10) Patent No.: US 9,621,950 B2
(45) Date of Patent: *Apr. 11, 2017

(54) TV PROGRAM IDENTIFICATION METHOD, APPARATUS, TERMINAL, SERVER AND SYSTEM

(71) Applicant: Tencent Technology (Shenzhen) Company Limited, Shenzhen (CN)

(72) Inventors: Xiaolong Zhang, Shenzhen (CN); Junbin Kuang, Shenzhen (CN); Yang Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,339

(22) Filed: May 10, 2016

(65) Prior Publication Data
US 2016/0255399 A1      Sep. 1, 2016

Related U.S. Application Data

(63) Continuation of application No. 14/325,277, filed on Jul. 7, 2014, now Pat. No. 9,363,551, which is a (Continued)

(30) Foreign Application Priority Data

Oct. 31, 2013  (CN) .......................... 2013 1 0533874

(51) Int. Cl.
*H04N 7/173*   (2011.01)
*H04N 7/16*    (2011.01)
(Continued)

(52) U.S. Cl.
CPC ...... *H04N 21/44008* (2013.01); *H04H 20/93* (2013.01); *H04H 60/33* (2013.01);
(Continued)

(58) Field of Classification Search
CPC ......... H04N 21/23418; H04N 21/4355; H04N 21/44008; H04N 5/50; H04N 21/41407; H04N 21/4622
See application file for complete search history.

(56) References Cited

U.S. PATENT DOCUMENTS 8,949,718 B2 * 2/2015 Issa ...................... G06F 3/0485
                                                      715/716
8,978,075 B1 * 3/2015 Kaiser .................... H04N 5/44
                                                       725/105
(Continued)

FOREIGN PATENT DOCUMENTS

CN      1518710 A      8/2004
CN      1723458 A      1/2006
(Continued)

OTHER PUBLICATIONS

Tencent Technology, Written Opinion, PCT/CN2014/076334, Jul. 30, 2014, 3 pgs.
(Continued)

*Primary Examiner* — Sumaiya A Chowdhury
(74) *Attorney, Agent, or Firm* — Morgan, Lewis & Bockius LLP

(57) ABSTRACT

A method for retrieving and playing a TV program uses a mobile terminal. The mobile terminal captures one or more images of a TV program currently played on a TV using the image sensor and sends the images to a remote server. The remote server extracts a TV station identifier from the received images, compares the received images with images stored in an image library and corresponding to the TV
(Continued)

station identifier, and determines an identity of the TV program when there is a match, generates an information record for the TV program, and returns the TV program information record to the mobile terminal, the TV program information record including a hyperlink to the TV program. After receiving the TV program information record from the remote server, the mobile terminal displays the hyperlink on the display of the mobile terminal.

15 Claims, 17 Drawing Sheets

Related U.S. Application Data continuation of application No. PCT/CN2014/076334, filed on Apr. 28, 2014.

(51) Int. Cl.

| | |
|---|---|
| *H04N 5/445* | (2011.01) |
| *H04N 21/44* | (2011.01) |
| *H04N 21/4223* | (2011.01) |
| *H04N 21/414* | (2011.01) |
| *H04H 60/44* | (2008.01) |
| *H04H 60/59* | (2008.01) |
| *H04H 60/58* | (2008.01) |
| *H04N 21/439* | (2011.01) |
| *H04N 21/658* | (2011.01) |
| *H04N 21/8405* | (2011.01) |
| *H04H 20/93* | (2008.01) |
| *H04H 60/37* | (2008.01) |
| *H04H 60/33* | (2008.01) |
| *H04H 60/65* | (2008.01) |
| *H04H 60/72* | (2008.01) |
| *H04H 60/85* | (2008.01) |
| *H04N 21/422* | (2011.01) |
| *H04N 21/482* | (2011.01) |
| *H04N 21/442* | (2011.01) |

(52) U.S. Cl.
CPC .......... *H04H 60/372* (2013.01); *H04H 60/44* (2013.01); *H04H 60/58* (2013.01); *H04H 60/59* (2013.01); *H04H 60/65* (2013.01); *H04H 60/72* (2013.01); *H04H 60/85* (2013.01); *H04N 21/41407* (2013.01); *H04N 21/4223* (2013.01); *H04N 21/42208* (2013.01); *H04N 21/42209* (2013.01); *H04N 21/4394* (2013.01); *H04N 21/4823* (2013.01); *H04N 21/6582* (2013.01); *H04N 21/8405* (2013.01); *H04N 21/44209* (2013.01)

(56) References Cited

U.S. PATENT DOCUMENTS

| | | | |
|---|---|---|---|
| 2009/0320070 A1* | 12/2009 | Inoguchi | H04N 7/163 725/40 |
| 2010/0245681 A1* | 9/2010 | Harris | H04N 7/173 18 348/734 |
| 2012/0331514 A1* | 12/2012 | Yeon | H04N 21/23418 725/97 |
| 2013/0018701 A1* | 1/2013 | Dusig | G06Q 30/02 705/7.32 |
| 2014/0047475 A1* | 2/2014 | Oh | H04N 21/4355 725/40 |
| 2014/0321752 A1* | 10/2014 | Zhang | G06F 17/30247 382/190 |

FOREIGN PATENT DOCUMENTS

| | | |
|---|---|---|
| CN | 101669310 A | 3/2010 |
| CN | 102547462 A | 7/2012 |
| CN | 102693061 A | 9/2012 |
| CN | 102833595 A | 12/2012 |
| CN | 103108228 A | 5/2013 |
| CN | 202998337 U | 6/2013 |
| CN | 103188549 A | 7/2013 |
| CN | 103200441 A | 7/2013 |
| WO | WO 2012154125 A1 | 11/2012 |

OTHER PUBLICATIONS

Tencent Technology, IPRP, PCT/CN2014/076334, May 3, 2016, 3 pgs.

Tencent Technology, ISR, PCT/CN2014/076334, Jul. 30, 2014, 3 pgs.

* cited by examiner

TV PROGRAM IDENTIFICATION METHOD, APPARATUS, TERMINAL, SERVER AND SYSTEM

RELATED APPLICATIONS

This application is a continuation application of U.S. patent application Ser. No. 14/325,277, entitled "TV PROGRAM IDENTIFICATION METHOD, APPARATUS, TERMINAL, SERVER AND SYSTEM" filed on Jul. 7, 2014, which is a continuation application of PCT Patent Application No. PCT/CN2014/076334, entitled "TV PROGRAM IDENTIFICATION METHOD, APPARATUS, TERMINAL, SERVER AND SYSTEM" filed on Apr. 28, 2014, which claims priority to Chinese Patent Application No. 201310533874.9, entitled "TV PROGRAM IDENTIFICATION METHOD, APPARATUS, TERMINAL, SERVER AND SYSTEM," filed on Oct. 31, 2013, all of which are incorporated by reference in their entirety.

TECHNICAL FIELD

The present application relates to the field of computer technologies, and particularly to a TV program identification method, apparatus, terminal, server and system.

BACKGROUND

In today's society, despite of rapid development of the Internet, TV is still the mainstream media platform, and users watch TV programs to understand information disseminated from TV stations. If a user inadvertently watches a segment of a program and wants to continue watching the follow-up program, it is necessary to identify the program.

In a conventional method, the user may acquire a keyword appearing in a segment of a program, manually click on a keyboard or click on a touch screen to input the keyword to a terminal; the terminal acquires the keyword input by the user; sends a program request to a server, where the program request is used for identifying a program corresponding to the keyword; receives a program returned by the server according to the program request, and takes the program as a TV program identification result of the keyword.

In the conventional method, the user cannot acquire a keyword of a program or may acquire a wrong keyword, so that the program request sent by the terminal to the server according to the keyword is wrong, and a correct program cannot be identified, which reduces accuracy of TV program identification.

SUMMARY

The above deficiencies and other problems associated with the conventional approach of watching a video such as a TV program using a mobile terminal are reduced or eliminated by the present application disclosed below. In some embodiments, the present application is implemented in a mobile terminal that has one or more processors, memory and one or more modules, programs or sets of instructions stored in the memory for performing multiple functions and communicating with a computer server that has one or more processors, memory and one or more modules, programs or sets of instructions stored in the memory for performing multiple functions. Instructions for performing these functions may be included in a computer program product configured for execution by one or more processors.

One aspect of the present application involves a method for retrieving and playing a TV program using a mobile terminal having one or more processors, memory storing program modules to be executed by the one or more processors, an image sensor, and a display. The mobile terminal obtains one or more images of a TV program currently played on a TV using the image sensor of the mobile terminal and sends the images to a remote server. The remote server determines an identity of the TV program using the images by comparing them with images in an image library and then generates an information record for the TV program and returns the TV program information record to the mobile terminal, the TV program information record including a hyperlink to the TV program. After receiving the TV program information record from the remote server, the mobile terminal displays the hyperlink on the display of the mobile terminal. In response to a user selection of the hyperlink, the mobile terminal plays the TV program on the display.

Another aspect of the present application involves a mobile terminal including one or more processors; an image sensor; memory; and one or more program modules stored in the memory and to be executed by the one or more processors. The program modules further include instructions for: obtaining one or more images of a TV program currently played on a TV using the image sensor; sending the images to a remote server, wherein the server is configured to determine an identity of the TV program using the images and generate an information record for the TV program; receiving the TV program information record including a hyperlink to the TV program from the remote server; displaying the hyperlink on the display of the mobile terminal; and in response to a user selection of the hyperlink, playing the TV program on the display of the mobile terminal.

Another aspect of the present application involves a method for identifying a TV program performed at a computer server having one or more processors and memory storing program modules to be executed by the one or more processors. The computer server receives one or more images from a mobile terminal. In some embodiments, the images are captured by the mobile terminal from a TV program currently played on a TV. The computer server compares the received images with images stored in an image library, each image in the image library corresponding to a unique TV program identifier. If there is a match between the received images and at least one of the images in the image library, the computer server identifies a TV program identifier corresponding to the received images and generates a TV program information record associated with the TV program identifier, the TV program information record including a hyperlink. Finally, the computer server returns the TV program information record to the mobile terminal. Upon receipt of the record, the mobile terminal displays the hyperlink on its display and plays the TV program in response to a user selection of the hyperlink.

Another aspect of the present application involves a server system including one or more processors; memory; and one or more program modules stored in the memory and to be executed by the one or more processors. The program modules further include instructions for: receiving one or more images from a mobile terminal; comparing the received images with images stored in an image library, wherein each image in the image library corresponds to a unique TV program identifier; in accordance with a determination that there is a match between the received images and at least one of the images in the image library, identifying a TV program identifier corresponding to the received images and generating a TV program information record associated with the TV program identifier, the TV program information record including a hyperlink; and returning the TV program information record to the mobile terminal, wherein the mobile terminal is configured to play the TV program in response to a user selection of the hyperlink.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application more comprehensible, embodiments of the present application are further described in detail below with reference to the accompanying drawings.

Figure 1:
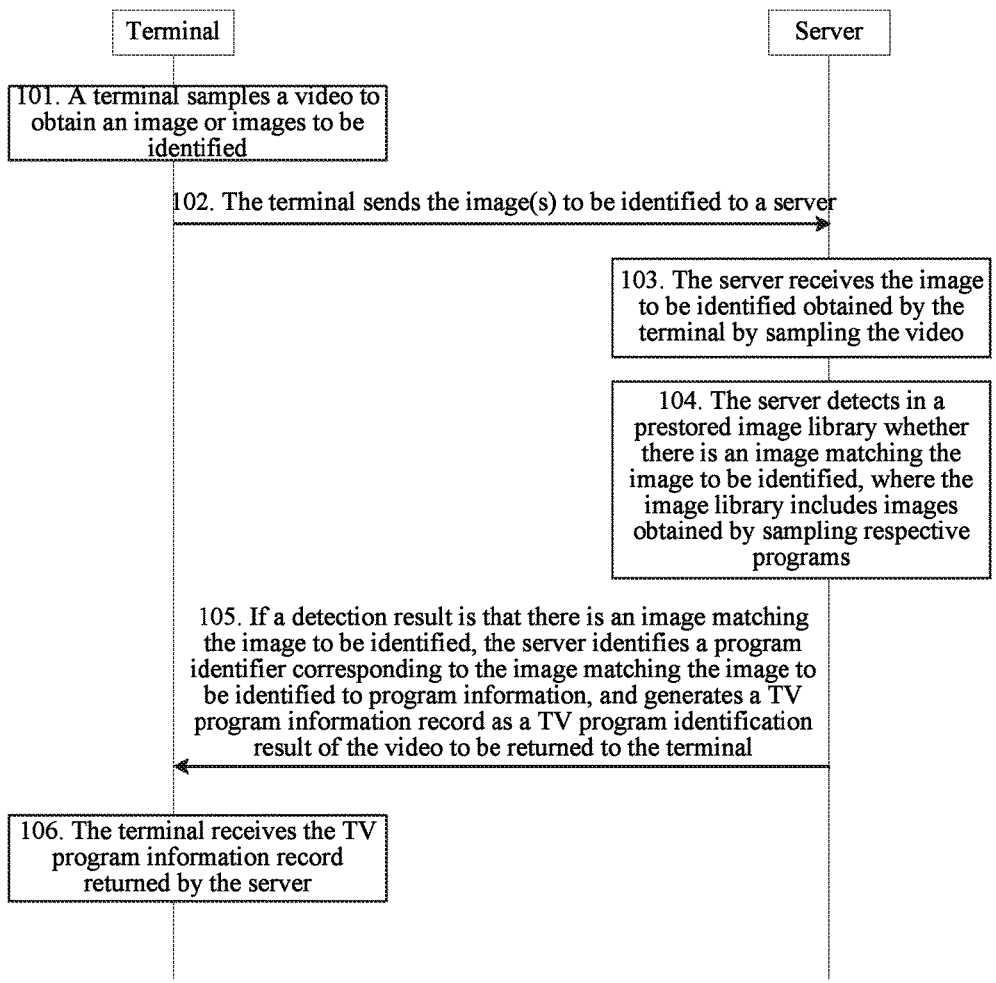
FIG. 1 is a flow chart of a TV program identification method according to an embodiment of the present application.

FIG. 1 is a flow chart of a TV program identification method according to an embodiment of the present application. The TV program identification method may be applied to a system including a server and a terminal, where the terminal may be a smart TV, a smart phone, a tablet PC or the like. The TV program identification method includes the following steps.

Step 101. A terminal samples a video to obtain an image to be identified.

Note that a video file that a user is viewing is not necessarily a live TV program. In this embodiment, the video file that a user is viewing is referred to as a video, and it is identified whether the video corresponds to a live TV program.

In some embodiments, the terminal may send the video to a remote server, and the server respectively identifies images and audios of the video. Alternatively, in order to reduce the difficulty of identifying the video by the server, the terminal may send the images and/or audios extracted from the video to the server, and the server performs TV program identification using the received images or audios. This embodiment assumes that the server performs TV program identification using images of the video for description.

Specifically, the terminal may sample the video using its built-in image sensor, and this embodiment does not limit the manner of how to sample the video. For example, the terminal may sample the video every other predetermined time, to obtain an image to be identified; or, the terminal may continuously sample the video, to obtain an image to be identified. FIG. 2B depicts an embodiment of using a mobile terminal to sample a TV program currently played on a TV. FIGS. 2C to 2E are screenshots illustrating how to sample a TV program using a mobile terminal.

In some embodiments, the terminal may also obtain audio samples of the TV programs when obtaining the images. One reason for obtaining the audio samples is that the size of an audio sample is much less than the size of an image and therefore requires less bandwidth to process and transmit. The terminal may send the audio sample and the images to the remote server so that the remote server can determine the identity of the TV program using both the audio sample and the images.

Step 102. The terminal sends the image(s) to be identified to a remote server. In some embodiments, the terminal sends the images in the format when they were captured to the remote server via a wired or wireless connection. In some other embodiments, the terminal processes the images first before sending them to the remote server. For example, the terminal may compress the images to reduce their total size using techniques like delta encoding when these images were captured continuously. In some embodiments, the terminal may extract a set of characteristic parameters from each image, e.g., pixel values at predefined locations, maximum/minimum/average pixel values and variations of the pixel values, and send only the set of characteristic parameters to the remote server in order to reduce the volume of data to be sent as long as the set of characteristic parameters can be used for uniquely identifying the image for the purpose of the present application. The reduction of data to be sent to the server can also make the subsequent comparison step more efficient.

Step 103. The server receives the image to be identified obtained by the terminal by sampling the video. In some embodiments, the server may perform certain image processing steps to the image before comparing them with the data in a prestored image library. For example, the server may generate a characteristic vector for each image and then use the characteristic vector to do the comparison. In one example, the characteristic vector is comprised of pixel values at predefined locations, maximum/minimum/average pixel values and variations of the pixel values of the image. In another example, the server rotates the image to be identified if it is determined that the image was not taken in a vertical direction. This rotation may be performed by first identifying a logo of the TV station at one of the four corners of the image and then comparing the identified logo with known logos to determine the rotation angle.

Step 104. The server detects in a prestored image library whether there is an image matching the image to be identified, where the image library includes images obtained by sampling respective TV programs.

The image library may be generated by the server according to respective TV programs, and also may be generated by a third-party device according to respective TV programs and be sent to the server, and this embodiment does not limit the manner of generating the image library.

This embodiment assumes that the server generates the image library according to respective TV programs as an example for description, and for each program acquired by the server, the server stores a set of images obtained by sampling the TFV program within a particular time window (e.g., 1 minute until the present time) and a correspondence relationship between the image set and a TV program identifier of the program, to combine an image of each TV program and a correspondence relationship into an image library. The more the number of the TV programs is, the greater the probability that the server identifies a video is, and the higher the accuracy of TV program identification on the video is.

Figure 8:
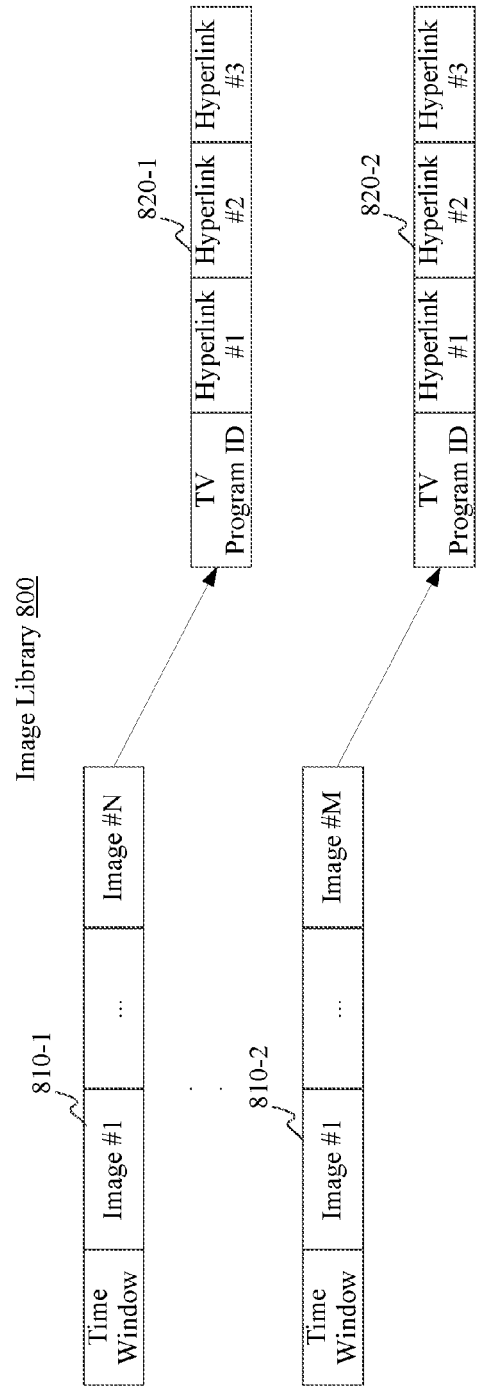
FIG. 8 is a schematic structural view of an image library according to an embodiment of the present application.

FIG. 8 depicts a schematic structural view of an exemplary image library 800. In this example, a set of images 810 are extracted from a TV program during the associated time window. As noted above, each image may be represented by a corresponding characteristic vector. A TV program 820 has a TV program identifier and one or more hyperlinks. There is a correspondence relationship between the set of images and the TV program 820. In some embodiments, one of the hyperlinks (e.g., Hyperlink #1) points to a primary source hosting the TV program and another hyperlink (e.g., Hyperlink #2) corresponds to a second source hosting the TV program. As will be explained below, both hyperlinks may be returned to the terminal so that a user of the terminal can choose one of them for playing the associated TV program. This is important when one of the two sources is temporarily unavailable. In some embodiments, there is another hyperlink (e.g., Hyperlink #3) pointing to a source hosting another TV program that is deemed to be related to the current TV program associated with the TV program ID. For example, the TV program may be the current episode of a TV series. The hyperlink identifies other episodes of the TV series so that a user can easily navigate from the current episode to the other ones. In some embodiments, different sets of images 810 associated with different TV programs are organized into a hash table so that an input image to be identified can be quickly mapped into one of the sets of images that correspond to the same TV program.

In some embodiments, as noted above, the server also receives an audio sample associated with the images to be identified from the terminal. In this case, one or more audio samples may be added to the image library such that the audio samples and the images are both used for determining the relationship between the data provided by the terminal and the TV program identifier. In some other embodiments, the server maintains an audio library like the image library. The server then compares the received audio sample with data samples stored in the audio library, each data sample in the audio library corresponding to a unique TV program identifier, to determine a TV program identifier corresponding to the received audio sample. For example, the server may return the TV program record if the TV program identifier corresponding to the received audio sample is the same as the TV program identifier corresponding to the received images. In other words, if the audio sample comparison result is different from the image comparison result, the server may not return either TV program identifier. In this case, the server may send a request to the terminal prompting the user to obtain new audio samples and/or images to perform a new round of comparison until the two TV program identifiers match each other or a predefined condition (e.g., three mismatches) is met. If there is no match between the two sides, the server then returns a message indicating that no TV program is found to the mobile terminal.

Step 105. If a detection result is that there is an image matching the image to be identified, the server identifies a TV program identifier corresponding to the image matching the image to be identified to program information (see, e.g., FIG. 8), and generates a TV program information record as a TV program identification result of the video to be returned to the terminal. In some embodiments, data in the image library is organized into different TV stations, each TV station having a unique TV station identifier. Before comparing the images provided by the terminal with the image library, the server first extracts a TV station identifier from the images. For example, the server may extract a logo of the TV station from the images and then convert the logo into a TV station identifier. After identifying the TV station identifier, the server selects a set of images (e.g., the set of images 810-1 in FIG. 8) that corresponds to the TV station identifier and then compares the received images with the selected set of images to determine whether there is a match between the received images and the selected set of images.

If there is an image matching the image to be identified, the server acquires a TV program identifier corresponding to the image matching the image to be identified according to a correspondence relationship between images and program identifiers, and takes the program identifier as a TV program identification result to be returned to the terminal. The program identifier may include, but is not limited to, TV station identifiers and TV program names.

As the server also may send other related information of the program to the terminal, in order to save transmission signaling, the server may add various related information of the TV program to the TV program information record to be returned to the terminal. Therefore, in this embodiment, the server also may add the TV program identifier and the hyperlinks to the TV program information record, and take the TV program information record as a TV program identification result to be returned to the terminal.

Step 106. The terminal receives the TV program information record returned by the server. In some embodiments, the TV program information record includes a hyperlink to the TV program hosted at a particular source. The terminal displays the hyperlink on its display. In response to a user selection of the hyperlink, the terminal then starts playing the TV program on the display as described below in connection with FIG. 2H. In some embodiments, the TV program information record includes TV program interactive information. In this case, the terminal displays the TV program interactive information adjacent the hyperlink on the display of the mobile terminal. In response to a user selection of the TV program interactive information, the terminal updates the play of the TV program in accordance with the user-selected TV program interactive information. For example, the TV program is a live music talent show that allows viewers to participate online by voting their favorite singers. The user of the terminal may press a voting button and replace the play of live music talent show with a user interface like the one shown in FIG. 2F. Through this user interface, the user can vote for the singer of his favorite.

In some embodiments, the TV program information record includes a timestamp indicating when the images of the TV program were obtained. This timestamp may be provided by the terminal when sending the images to be identified. Alternatively, this timestamp may be generated by the server when comparing the images to be identified with the data in the image library. Upon receipt of the timestamp, the terminal may have at least two options: (i) playing the TV program from the beginning or (ii) playing the TV program from the timestamp. For example, the terminal may list both options on the display. If the user chooses to watch the TV program starting at the timestamp, the user can choose the second option. This scenario is useful when the user needs to leave from the TV set where the TV program is being broadcast but would like to continue watching the TV program on his smartphone.

In some embodiments, the TV program information record includes a second hyperlink to a second copy of the TV program located at a second source. As noted above in connection with FIG. 8, the server may return multiple hyperlinks pointing to different copies of the TV program stored at different locations (i.e., web servers). The terminal then displays the second hyperlink on the display. As shown in FIG. 2I, there may be multiple second hyperlinks, each hyperlink pointing to a respective secondary source for hosting the TV program. In response to a user selection of one of the second hyperlinks, the terminal retrieves the second copy of the TV program from the second source and plays the TV program on the display of the mobile terminal.

In some embodiments, the TV program information record includes a third hyperlink to another TV program associated with the TV program currently played on the TV. As described above, the other TV program may be another episode from the same TV series or a TV program produced by the same director or featuring the same actor or topic. As shown in FIG. 2G, the terminal lists the other TV programs from the same TV station along with the TV program that is currently broadcast on a TV. Each TV program has a third hyperlink pointing to a remote source for retrieving the program. In response to a user selection of the third hyperlink, the mobile terminal plays another TV program on the display of the mobile terminal. This feature provides additional convenience for the user to navigate through TV programs that he may be interested in watching.

Steps 101, 102 and 106 may be implemented by the terminal individually, and steps 103 to 105 may be implemented by the server individually.

In sum, the TV program identification method according to this embodiment of the present application includes receiving an image to be identified obtained by a terminal by sampling a video; detecting in a prestored image library whether there is an image matching the image to be identified, where the image library includes images obtained by sampling respective programs; and if a detection result is that there is an image matching the image to be identified, adding a TV program identifier corresponding to the image matching the image to be identified to program information, and taking the program information as a TV program identification result of the video to be returned to the terminal, and as a user definitely could obtain an image of a video through sampling while viewing the video and accuracy of the image obtained through sampling is higher, performing TV program identification according to the image to be identified obtained through sampling solves the problem that the user cannot acquire a keyword or a correct program cannot be identified and accuracy of TV program identification is reduced because a keyword acquired is wrong, which achieves the effect of improving the accuracy of TV program identification.

Figure 2A:
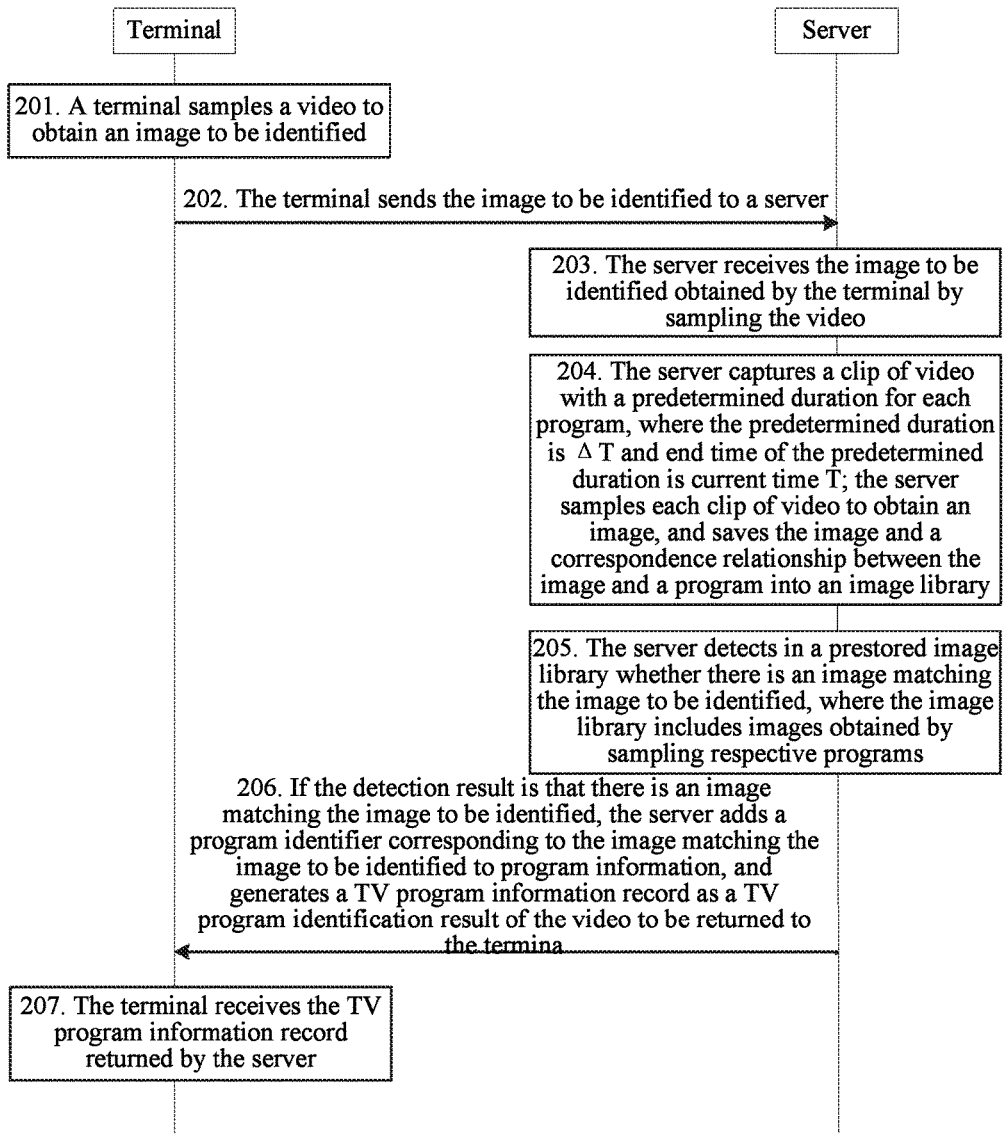
FIG. 2A is a flow chart of a TV program identification method according to another embodiment of the present application.
Figure 2B:
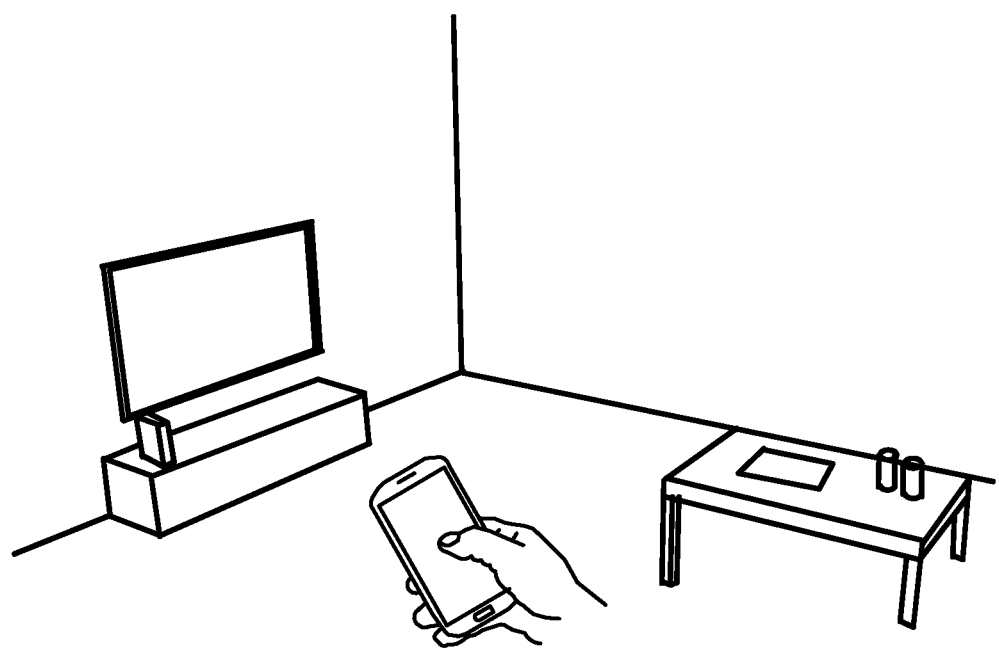
FIG. 2B is a schematic view of an application scenario of TV program identification according to an embodiment of the present application.
Figure 2C:
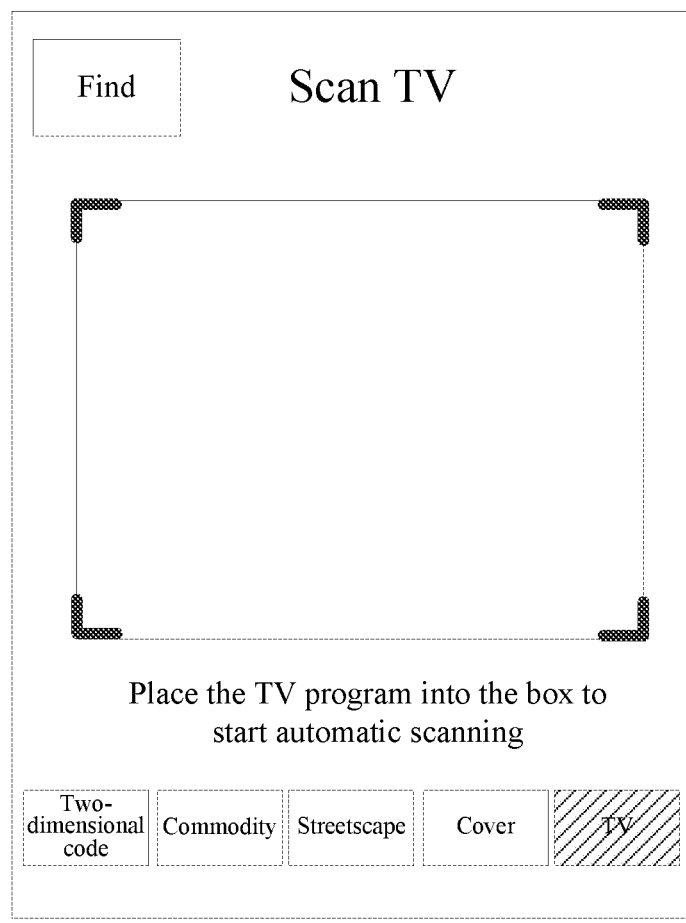
FIG. 2C is a schematic view of a trigger interface of a terminal according to an embodiment of the present application.
Figure 2D:
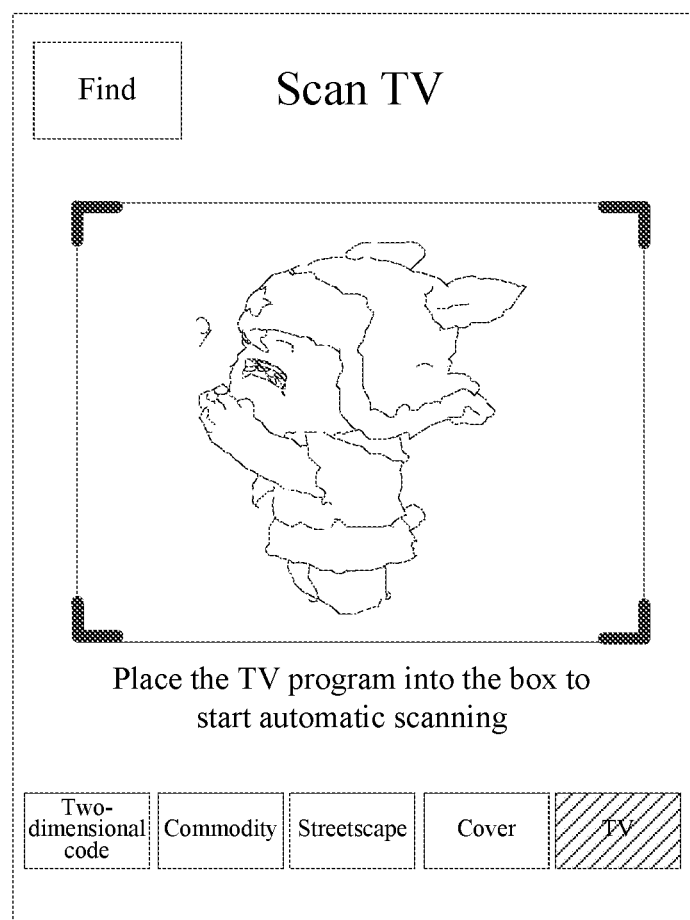
FIG. 2D is a schematic view of acquiring an image to be identified according to an embodiment of the present application.
Figure 2E:
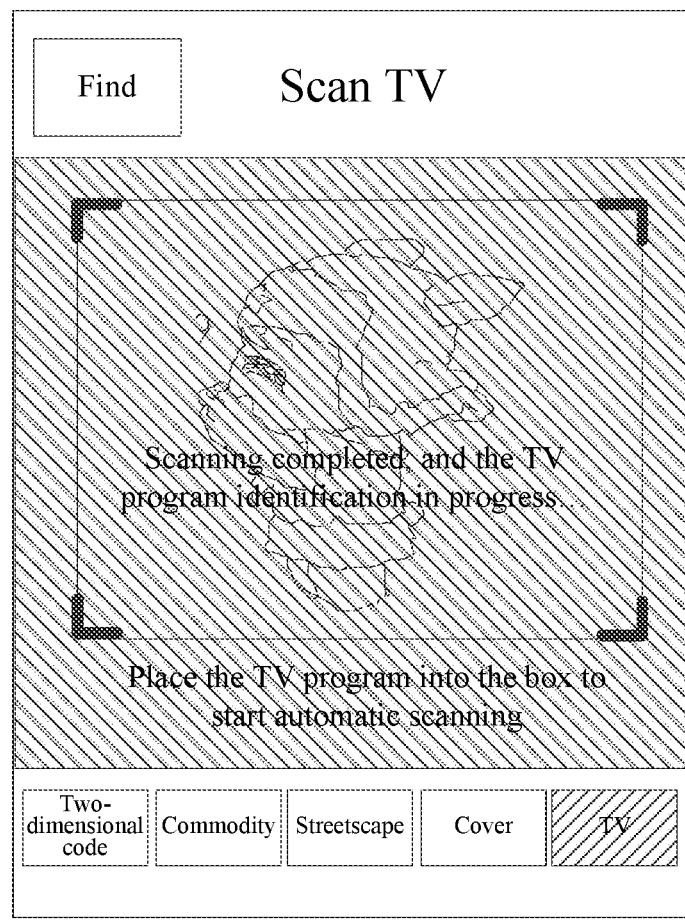
FIG. 2E is a schematic view of processing of TV program identification according to an embodiment of the present application.

FIG. 2A is a flow chart of a TV program identification method according to another embodiment of the present application. The TV program identification method may be applied to a system including a server and a terminal, where the terminal may be a smart TV, a smart phone, a tablet PC or the like. The TV program identification method includes the following steps.

Step 201. A terminal samples a video to obtain an image to be identified.

As a video file that a user is viewing is not necessarily a live TV program, in this embodiment, the video file that a user is viewing is referred to as a video, and it is identified whether the video is a program.

The terminal may send a video to a server, and the server respectively identifies images and audios of the video; or, preferably, in order to reduce the difficulty of identifying the video by the server, the terminal may send the images and/or audios extracted from the video to the server, and the server performs TV program identification according to the received images or audios. This embodiment takes that the server performs TV program identification according to images of the video for description.

In order to avoid waste of resources caused by real-time sampling the video by the terminal, a sampling trigger operation may be set for the terminal, and if the terminal has received a trigger signal generated by executing the trigger operation, it is determined that the video is sampled. Sampling a video to obtain an image to be identified includes:

a. detecting whether a trigger signal has been received; and b. if a detection result is that a trigger signal has been received, invoking a camera to photograph playback images of the video, to obtain an image to be identified.

In this embodiment, the trigger signal may include any combination of one or more of a keyboard signal, a single-click signal, a double-click signal, a multi-click signal, a cursor or click stop signal, a predetermined gesture signal and a shortcut key signal. The trigger signal may be generated with a user clicking on a keyboard or clicking on a touch screen.

The terminal may invoke a camera to photograph playback images of the video. Further, in order to improve accuracy of TV program identification, the terminal may photograph the playback images of the video at least twice, to obtain at least two images to be identified, and this embodiment does not limit the manner of photographing the playback images of the video. For example, the terminal may photograph the playback images of the video every other predetermined time, to obtain images to be identified; or, the terminal may continuously photograph the playback images of the video, to obtain images to be identified.

In order to facilitate understanding of application scenarios in this embodiment, reference may respectively be made to the schematic view of an application scenario of TV program identification shown in FIG. 2B, the schematic view of a trigger interface of a terminal shown in FIG. 2C and the schematic view of acquiring an image to be identified shown in FIG. 2D. In FIG. 2B, if a user triggers TV program identification in the process of watching a TV program, the interface shown in FIG. 2C appears in the terminal, when the user selects the "TV" option in FIG. 2C, the terminal determines that a trigger signal has been received, starts an application of TV program identification at this time, prompts the user to place the TV program into a box in the terminal interface, and automatically scans the TV program, to obtain the image to be identified in FIG. 2D.

Step 202. The terminal sends the image to be identified to a server.

The terminal may send a signal to the server via a wired or wireless network. For example, a signal is sent to the server via a 2nd Generation (2G), 3rd Generation (3G) or Wireless Fidelity (Wi-Fi) network, and this embodiment does not limit the sending manner.

Further, if the number of the image to be identified is at least two, sending the image to be identified to a server includes:

a. sending at least two images to be identified to the server; or b. selecting an image to be identified with a maximum identification parameter value from the at least two images to be identified, and sending the selected image to be identified to the server.

The terminal may send at least two images to be identified to the server, and the server performs TV program identification according to the at least two images to be identified; or, in order to save transmission overhead, the terminal may screen the at least two images to be identified, and send an image to be identified most suitable for TV program identification to the server.

Specifically, the terminal may determine identification parameter values according to the server's image identification manner, and select an image to be identified with a maximum identification parameter value from the at least two images to be identified; the greater the identification parameter value is, the better for image identification, therefore, the selected image to be identified is determined as an image most suitable for TV program identification, and the image is sent to the server for identification, thereby further improving accuracy of TV program identification. The identification parameter values refer to calculation parameters in image identification, and may be image definition, feature points and the like.

Step 203. The server receives the image to be identified obtained by the terminal by sampling the video.

If the terminal has screened the images to be identified, the server receives an image to be identified most suitable for TV program identification; and if the terminal does not screen the images to be identified, the server receives at least two images to be identified.

Step 204. The server captures a clip of video with a predetermined duration for each program, where the predetermined duration is ΔT and end time of the predetermined duration is current time T; the server samples each clip of video to obtain an image, and saves the image and a correspondence relationship between the image and a program into an image library.

The image library may be generated by the server according to respective programs, and also may be generated by a third-party device according to respective programs and be sent to the server, and this embodiment does not limit the manner of generating the image library.

This embodiment takes that the server generates the image library according to respective programs as an example for description, and for each program acquired by the server, the server captures a clip of video with a predetermined duration for the program, samples the clip of video, stores the image obtained through sampling and a correspondence relationship between the image and a TV program identifier of the program, and combines an image of each program and a correspondence relationship into an image library. The more the number of the programs is, the greater the probability that the server identifies a video is, and the higher the accuracy of TV program identification on the video is.

Further, as a delay may occur when the terminal sends an image to the server, in order to ensure that the image acquired by the server includes the image to be identified sent by the terminal, a duration of the clip of video captured by the server also may be set as a predetermined duration greater than a video duration, where the predetermined duration is ΔT and end time of the predetermined duration is current time T. Generally, the predetermined duration of the clip of video may be set as 1 minute.

Step 205. The server detects in a prestored image library whether there is an image matching the image to be identified, where the image library includes images obtained by sampling respective programs.

If the server receives at least two images to be identified, the server, before performing TV program identification, also needs to screen the at least two images to be identified, to obtain an image to be identified most suitable for TV program identification.

Specifically, if the number of the image to be identified is at least two, detecting in a prestored image library whether there is an image matching the image to be identified includes:

a. selecting an image to be identified with a maximum identification parameter value from at least two images to be identified; and b. detecting in the image library whether there is an image matching the selected image to be identified.

The server may determine identification parameter values according to an image identification manner, and select an image to be identified with a maximum identification parameter value from at least two images to be identified; the greater the identification parameter value is, the better for image identification, therefore, the selected image to be identified is determined as an image most suitable for TV program identification, thereby further improving accuracy of TV program identification. The identification parameter values may be image definition, feature points and the like.

Detecting in a prestored image library whether there is an image matching the image to be identified may specifically includes:

a. calculating similarities between the image to be identified and each image in the image library;

b. determining a maximum similarity in all the similarities;

c. detecting whether the maximum similarity exceeds a predetermined threshold; and d. if a detection result is that the maximum similarity exceeds a predetermined threshold, determining that the image to be identified matches an image corresponding to the maximum similarity, that is, the image library has an image matching the selected image to be identified.

To facilitate understanding, an example is given for description. Suppose similarities between the image to be identified and a first image, a second image as well as a third image in the image library are respectively 15%, 20% and 85%, the maximum similarity is 85%; if the predetermined threshold is 80%, the maximum similarity 85% is greater than the predetermined threshold 80%, and the image to be identified matches the third image.

It is necessary to add that, if the server receives an image to be identified most suitable for TV program identification, the server directly detects in the image library whether there is an image matching the received image to be identified. The process of detecting in the image library whether there is an image matching the received image to be identified is the same as the process of detecting in the image library whether there is an image matching the selected image to be identified, which is not repeated herein.

Step 206. If the detection result is that there is an image matching the image to be identified, the server adds a TV program identifier corresponding to the image matching the image to be identified to program information, and generates a TV program information record as a TV program identification result of the video to be returned to the terminal.

If there is an image matching the image to be identified, the server acquires a TV program identifier corresponding to the image matching the image to be identified according to a correspondence relationship, and takes the program identifier as a TV program identification result to be returned to the terminal. The program identifier may include, but is not limited to, TV station identifiers and program names.

As the server also may send other related information of the program to the terminal, in order to save transmission signaling, the server may add various related information of the TV program to the TV program information record to be returned to the terminal. Therefore, in this embodiment, the server also may add the program identifier to program information, and take the TV program information record as a TV program identification result to be returned to the terminal.

Specifically, before taking the program information as a TV program identification result of the video to be returned to the terminal, the method further includes:

a. searching interactive information corresponding to the program identifier in a preset interactive information library, and adding the interactive information to the program information, where the interactive information is used for identifying an interactive activity of a program; and/or b. searching a playback link corresponding to the program identifier in a preset resource library, and adding the playback link to the program information.

a. Searching interaction information corresponding to the program identifier in a preset interactive information library, and adding the interactive information to the program information.

The interactive information may include at least one of a TV program identifier corresponding to the interactive information, activity time of the interactive activity, a thumbnail of the interactive activity, and introduction information of the interactive activity and a link participating in the interactive activity. The interactive information library is pre-established by the server, and may include at least one interactive information. The interactive information may include a link participating in the interactive activity. For example, the interactive activity may be at least one of voting, shopping, review, lottery, program information acquisition and video viewing, and the interactive information may correspondingly include at least one of a voting link, a shopping link, a review link, a lottery link, a program information link and a video link entering corresponding pages. Further, the interactive information also may include activity time of the interactive activity, a thumbnail of the interactive activity, introduction information of the interactive activity and the like, and this embodiment does not limit the interactive information.

Optionally, the server also may receive at least one interactive information corresponding to a TV program identifier sent by a third-party client; and establish an interactive information library according to the at least one interactive information. The third-party client may previously edit interactive information of an interactive activity to be carried out in a program, and send the edited interactive information to the server, and after receiving the interactive information, the server may establish an interactive information library for the received at least one interactive information, to facilitate management of the interactive information. A third-party server may be a TV station, which is not limited in this embodiment.

Further, in order to improve security of program interaction, the third-party client also may be authenticated, to avoid publication of malicious interactive information, thus avoiding that the terminal participates in a false interactive activity and improving security of the interactive activity. For example, the third-party client may apply for a public account from the server, and after the server passes authentication of the third-party client and grants the public account to the third-party client, the third-party client may log in the server through the public account, and edit or send interactive information through the public account.

As interactive activities are not carried out in some programs, the server also needs to detect whether an interactive activity exists in a program currently; and if an interactive activity exists in a program currently, it is determined to find interactive information in the interactive information library.

Specifically, the activity time of the interactive activity may include start time of the interactive activity and end time of the interactive activity, and the server may acquire current time and detect whether the current time belongs to [start time, end time]; if the current time belongs to [start time, end time], it determines that an interactive activity exists currently, and may find interactive information in the interactive information library; if the current time does not belong to [start time, end time], it determines that an interactive activity does not exist currently, and may return response information indicating that no interactive activity exists to the terminal.

b. Searching a playback link corresponding to the program identifier in a preset resource library, and adding the playback link to the program information.

In this embodiment, the server also may acquire a playback link corresponding to the program identifier, and return the playback link to the terminal. As processing capacity of the server is stronger than that of the terminal, the server, instead of the terminal, acquires the playback link, which may improve the efficacy of acquiring the playback link.

Specifically, the server may pre-establish a correspondence relationship between a TV program identifier and a playback link, and after acquiring the program identifier, acquire the playback link corresponding to the program identifier according to the correspondence relationship.

As one program identifier may correspond to multiple playback links, the server also needs to distinguish the playback links. Adding the playback link to the program information includes:

a. acquiring a website identifier of a source website of the playback link; and b. adding the playback link and a correspondence relationship between the playback link and the website identifier to the program information.

In this embodiment, the server distinguishes playback links through source websites of the playback links. Specifically, the server may acquire a website identifier of a source website of a playback link when acquiring the playback link, establish a correspondence relationship between the playback link and the website identifier, and add the playback link and the correspondence relationship to the program information.

Further, before taking the program information as a TV program identification result to be returned to the terminal, the method further includes:

setting a program list for programs whose playback time is after that of a program identified by a TV program identifier according to a predetermined policy, and adding the program list to the program information.

In this embodiment, the server also may set a program list for programs whose playback time is after that of a program identified by a TV program identifier, and announce in advance following programs through the program list. The programs in the program list may be programs to be announced in advance pre-selected by a user, or, programs recommended by the server according to a click-through rate or a collection rate, or, programs from the same TV station as the program identified by the program identifier, or, programs whose playback time is closest to that of the program identified by the program identifier.

Further, the server also may correspondingly add playback time of each program in the program list to the program information, so as to facilitate the user to view programs according to the playback time.

Further, the server also may correspondingly add announcement information of each program in the program list to the program information, so as to facilitate the user to decide whether to view the programs in the program list.

Further, the server also may acquire a thumbnail of the program identified by the program identifier, program introduction and other introduction information, and add the introduction information to the program information, so as to facilitate the user to clarify program content and decide whether to view the program.

It is necessary to add that the server may add at least one of the interactive information, the playback link, the program list and the introduction information and the program identifier to the program information, and return the added program information to the terminal. This embodiment does not limit an execution order between the step of the server acquiring the interactive information, the step of the server acquiring the playback link, the step of the server acquiring the program list and the step of the server acquiring the introduction information.

Referring to the schematic view of processing of TV program identification shown in FIG. 2E, FIG. 2E shows a display interface before the terminal receives the TV program information record returned by the server.

Step 207. The terminal receives the TV program information record returned by the server.

If the program information only includes a TV program identifier, the terminal may display the program identifier, so that the user, after acquiring the program identifier, acquire or share a program identified by the program identifier.

If the program information includes interactive information or a playback link in addition to a TV program identifier, after receiving the program information returned by the server, the method further includes:

a. if the program information further includes interactive information corresponding to the program identifier, displaying the interactive information, and participating in an interactive activity identified by the interactive information when receiving a first operation signal acting upon the displayed interactive information; and b. if the program information further includes a playback link corresponding to the program identifier, displaying the playback link, and acquiring a program from the playback link when receiving a second operation signal acting upon the displayed playback link.

a. If the program information further includes interactive information corresponding to the program identifier, displaying the interactive information, and participating in an interactive activity identified by the interactive information when receiving a first operation signal acting upon the displayed interactive information.

As the interactive information may include at least one of a TV program identifier corresponding to the interactive information, activity time of the interactive activity, a thumbnail of the interactive activity, and introduction information of the interactive activity and a link participating in the interactive activity, the terminal may display at least one of the program identifier, the activity time, the thumbnail and the introduction information and the link; receive a participation signal acting upon the link; and display a page corresponding to the link according to the participation signal.

The terminal also may display a brief introduction of an interactive activity to the user, such as activity time, a thumbnail and introduction information, so that the user may understand the interactive activity according to the displayed information and decide whether to participate in the interactive activity. If the user decides to participate in the interactive activity, the user may click on the link displayed in the terminal, and after receiving the first operation signal acting upon the link, the terminal may request a page corresponding to the link from the server, and display the page returned by the server. The page may be a page of an application in the terminal, a page corresponding to an account in the application, a page provided by an application or a third party or the like, which is not limited in this embodiment.

Specifically, if the link is a lottery link, a terminal identifier of the terminal may be sent to a radio station through the lottery link, so that the radio station may determine the terminal identifier as lottery information of the terminal after receiving the terminal identifier;

if the link is a voting link, a candidate identifier determined by the terminal may be sent to the radio station through the voting link, so that the radio station may increase the number of votes for a candidate after receiving the candidate identifier;

if the link is a review link, review content determined by the terminal may be sent to the radio station through the review link, so that the radio station may display the review content after receiving the review content;

if the link is a shopping link, a terminal identifier of the terminal and a commodity identifier determined by the terminal may be sent to the radio station through the shopping link, so that the radio station may determine to sell a commodity to the terminal after receiving the terminal identifier and the commodity identifier;

if the link is a program information link, a request for acquiring program information may be sent to the radio station through the program information link, so that the radio station may return the program information to the terminal after receiving the request; and if the link is a video viewing link, a request for acquiring a video may be sent to the radio station through the video viewing link, so that the radio station may return the video to the terminal after receiving the request.

Figure 2F:
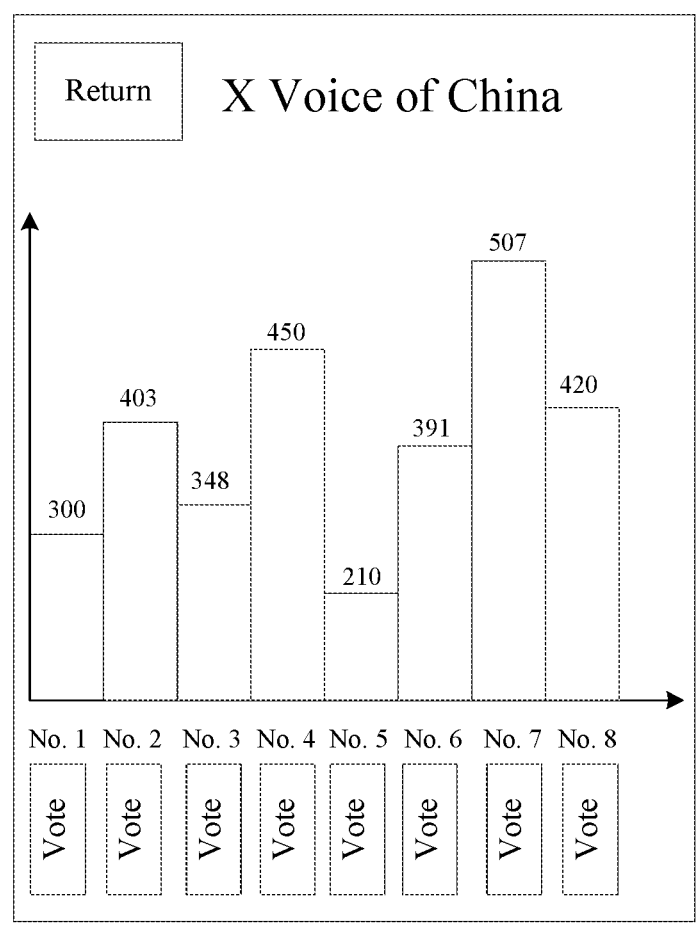
FIG. 2F is a schematic view of a voting interface according to an embodiment of the present application.
Figure 2G:
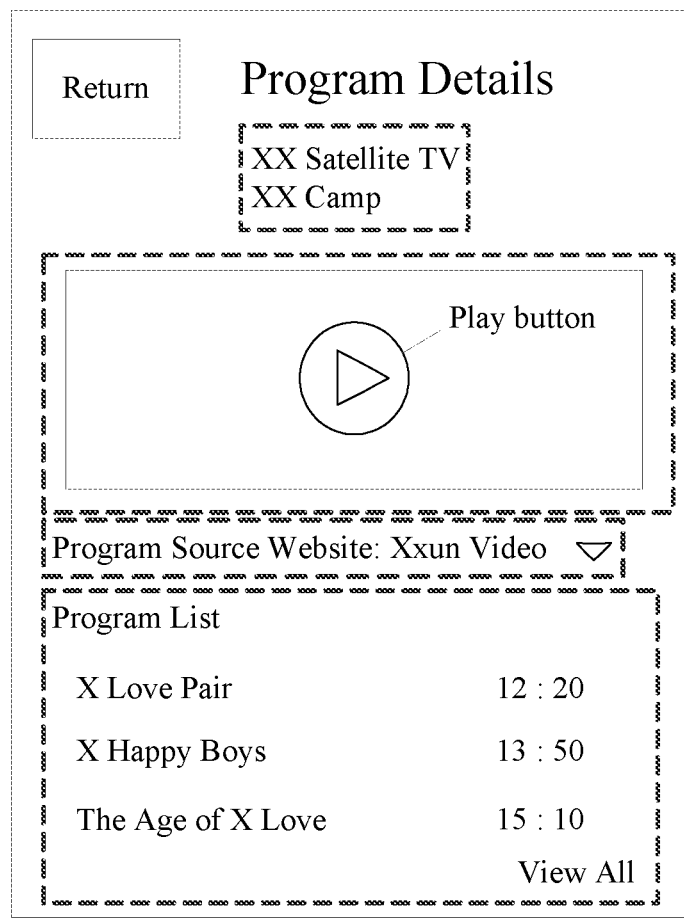
FIG. 2G is a schematic view of displaying a playback link according to an embodiment of the present application.
Figure 2H:
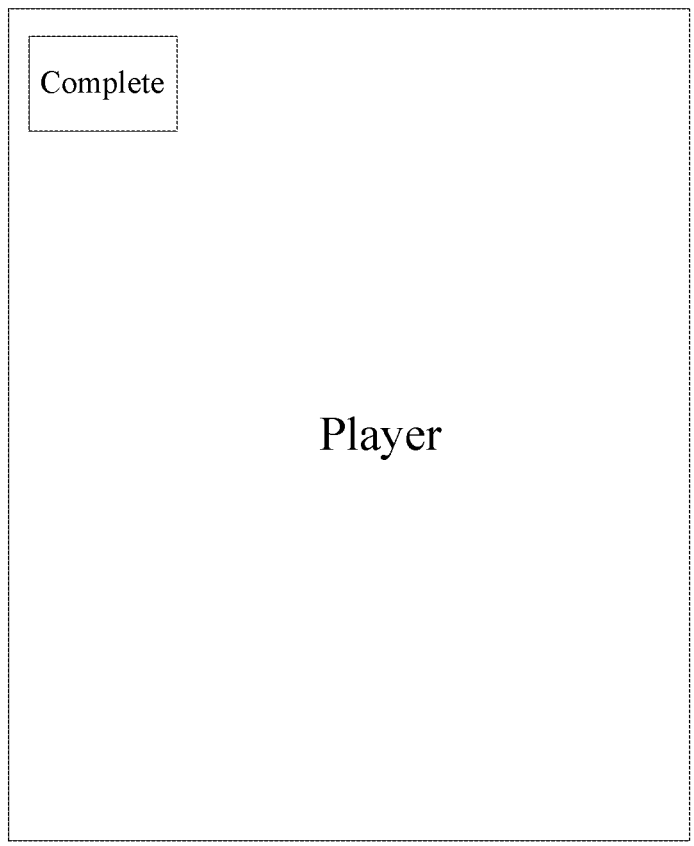
FIG. 2H is a schematic view of playing a program according to an embodiment of the present application.
Figure 2I:
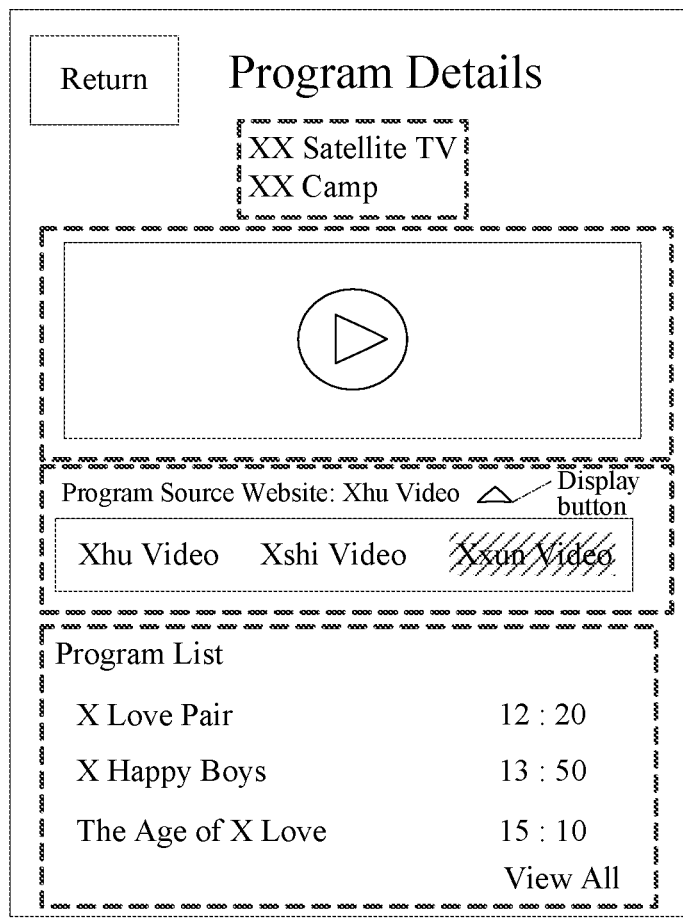
FIG. 2I is a schematic view of selecting a playback link according to an embodiment of the present application.

If the link is a voting link, reference may be made to the schematic view of a voting interface shown in FIG. 2F, which shows an interface opened by the terminal according to the voting link. After clicking on the link, the terminal enters the voting interface as shown in FIG. 2F, the interface includes the number of votes for each player and a button for voting each player, if the user clicks on a voting button corresponding to No. 7 Player, the number of votes for No. 7 is correspondingly increased with 1. The interface may be an interface of an application, may be an interface provided by the public account, and also may be a page provided by an application or a third party, which is not limited in this embodiment.

b. If the program information further includes a playback link corresponding to the program identifier, displaying the playback link, and acquiring a program from the playback link when receiving a second operation signal acting upon the displayed playback link.

The terminal may display a playback link to the user, so that the user can, when needing to view the program, click on the playback link displayed in the terminal, and the terminal acquires a program from the playback link after receiving a second operation signal acting upon the playback link. Specifically, the terminal may invoke a player installed in the terminal to play the program. Referring to the schematic view of displaying a playback link shown in FIG. 2G, the playback link in FIG. 2G may be displayed in the form of a play button. When the user clicks on the play button, the terminal invokes a player to play the program; reference may be made to the schematic view of playing a program shown in FIG. 2H.

As the number of the playback link included in the program information may be at least two, the terminal may display all the playback links, or, in order to save display space of the playback links in the page, the terminal also may display playback links meeting a predetermined condition, for example, a playback link with the best image quality, a playback link with the highest click-through rate or collection rate, a playback link of a website that the user usually views and the like.

If the number of the playback link is at least two, the terminal may distinguish the playback links through source websites of the playback links. For example, the terminal may correspondingly display the playback links and website identifiers of the source websites of the playback links. Referring to FIG. 2G, a lower part of a playback link displays a program source website "Xxun Video" of the playback link.

Further, this embodiment also may modify the playback link and the website identifier correspondingly displayed. If the program information also includes playback links and a correspondence relationship between the playback links and website identifiers of source websites of the playback links and the number of the website identifiers is at least two, acquiring a program from the playback link includes:

a. receiving a select signal selecting a website identifier, and determining a website identifier to be selected according to the select signal;

b. determining a playback link corresponding to the selected website identifier according to the correspondence relationship; and c. acquiring a program from the determined playback link.

Referring to the schematic view of selecting a playback link shown in FIG. 2I, FIG. 2I originally displays a playback link from "Xhu Video," the user may click on a display button at the rear of "Program Source Website" for displaying all website identifiers, and the terminal may display all the website identifiers. After receiving the select signal for "Xxun Video," the terminal modifies the website identifier as "Xxun Video" from "Xhu Video," and displays a playback link corresponding to the "Xxun Video." When the user clicks on the playback link displayed in the form of a play button, the terminal invokes a player to play a program from "Xxun Video;" reference may be made to "Program Source Website: Xxun Video" shown in FIG. 2G.

If the program information includes a program list in addition to program identifiers, after receiving the program information returned by the server, the method further includes:

if the program information further includes a program list set for programs whose playback time is after that of a program identified by a TV program identifier, displaying the program list.

The terminal may display a program list to the user, so that the user may view a program when being interested in the program in the program list. Further, in order to clarify viewing time of a program in the program list, the program information also may include playback time of the program, so that the user may view the program according to the playback time. Reference may be made to "Program List" in FIG. 2I.

Further, in order to clarify playback content of a program in the program list, the program information also may include announcement information of the program, so that the user may decide whether to view the program according to the announcement information. The terminal may display the announcement information and the program correspondingly, or, the terminal may only display the program, and display the announcement information of the program when receiving a select signal generated by performing a select operation on the program in the program list by the user.

Further, when the user performs the select operation, the user also may make an appointment for a program. That is, when time reaches playback time of the program, the terminal prompts the user to view the program in the program list or automatically acquires the playback link of the program, to facilitate the user to view the program.

Further, when the terminal displays the program list, in order to save display space of the program list, only a predetermined number of programs may be displayed, and display links of the remaining programs in the page are displayed. If the user's operation on the display links is received, all the programs in the program list are displayed. Reference may be made to the "View All" link in FIG. 2I.

If the program information includes introduction information in addition to program identifiers, the terminal also may display the introduction information, so that the user may clarify program content according to the introduction information, thereby deciding whether it is necessary to view the program.

Figure 2J:
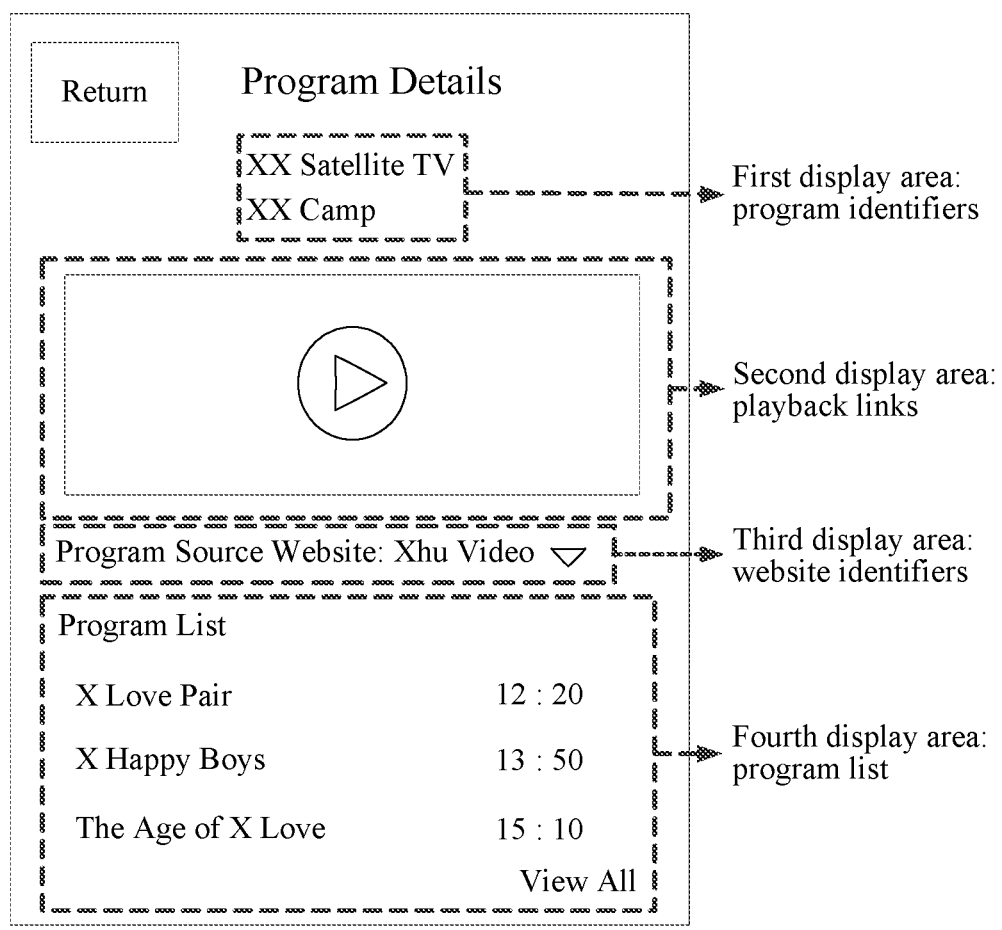
FIG. 2J is a schematic view of displaying program information according to an embodiment of the present application.

It is necessary to add that the terminal may display all the content included in the program information, or, the terminal displays predetermined content included in the program information, which is not limited in this embodiment. Referring to the schematic view of displaying program information shown in FIG. 2J, a first display area in FIG. 2J displays program identifiers, a second display area displays playback links, a third display area displays website identifiers and a fourth display area displays a program list.

Figure 2K:
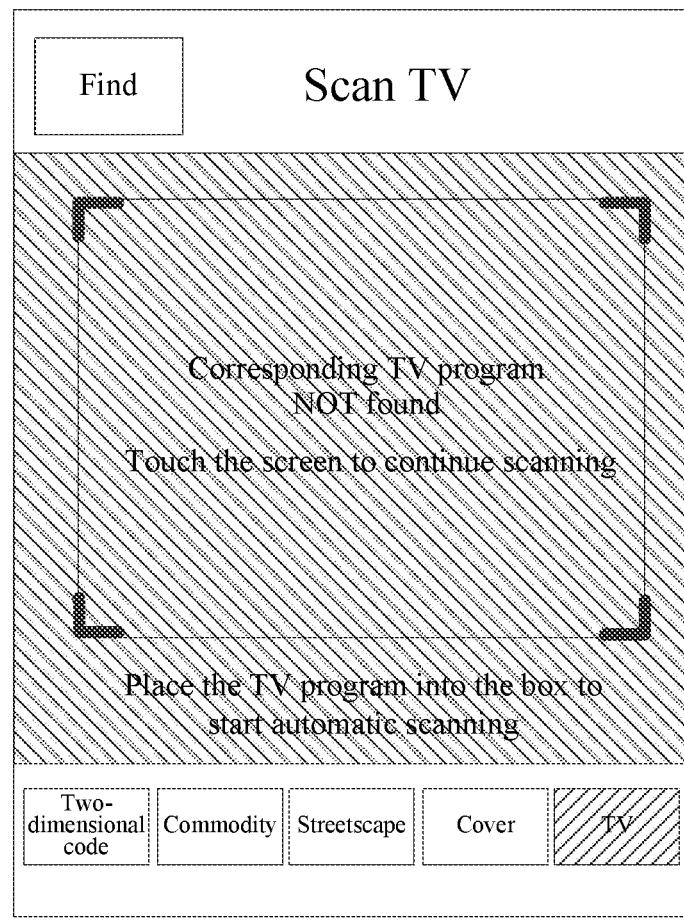
FIG. 2K is a schematic view of an interface of TV program identification failure according to an embodiment of the present application.

It is necessary to add that, if the image library does not have an image matching the image to be identified, the server sends response information indicating that no program is detected to the terminal, and after receiving the response information, the terminal displays the response information, so that the user may perform a related operation according to the displayed response information. Referring to the schematic view of an interface of TV program identification failure shown in FIG. 2K, the interface in FIG. 2K displays the content that "no corresponding program has been found." If the user needs to continue the TV program identification, the user may perform the TV program identification again according to a displayed indication of "touch the screen to continue scanning."

Steps 201, 202 and 207 may be implemented by the terminal individually, and steps 203 and 206 may be implemented by the server individually.

In sum, the TV program identification method according to this embodiment of the present application includes receiving an image to be identified obtained by a terminal by sampling a video; detecting in a prestored image library whether there is an image matching the image to be identified, where the image library includes images obtained by sampling respective programs; and if a detection result is that there is an image matching the image to be identified, adding a TV program identifier corresponding to the image matching the image to be identified to program information, and taking the program information as a TV program identification result of the video to be returned to the terminal, and as a user definitely could obtain an image of a video through sampling while viewing the video and accuracy of the image obtained through sampling is higher, performing TV program identification according to the image to be identified obtained through sampling solves the problem that the user cannot acquire a keyword or a correct program cannot be identified and accuracy of TV program identification is reduced because a keyword acquired is wrong, which achieves the effect of improving the accuracy of TV program identification. In addition, by selecting an image to be identified with a maximum identification parameter value from at least two images to be identified and detecting in an image library whether there is an image matching the selected image to be identified, an image to be identified with a maximum identification parameter value may be selected in a different image identification manner, and as the greater the identification parameter value is, the better for image identification, the selected image to be identified is an image most suitable for TV program identification, which improves accuracy of the server's identification result for the image to be identified, and achieves the effect of further improving accuracy of TV program identification.

Figure 3:
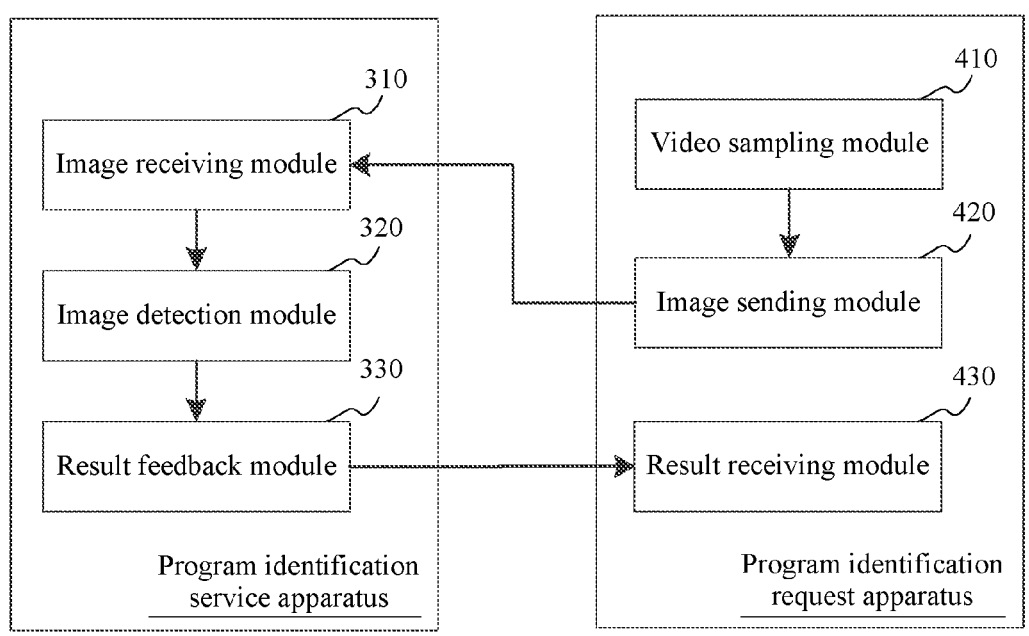
FIG. 3 is a schematic structural view of a TV program identification system according to an embodiment of the present application.

FIG. 3 is a schematic structural view of a TV program identification system according to an embodiment of the present application. The program interaction system may include: a TV program identification service apparatus and a TV program identification request apparatus, where the TV program identification service apparatus may include an image receiving module 310, an image detection module 320 and a result feedback module 330, and the TV program identification service apparatus may be implemented as all or part of a certain server by means of software, hardware or a combination of software and hardware; the TV program identification request apparatus may include a video sampling module 410, an image sending module 420 and a result receiving module 430, and the TV program identification request apparatus may be implemented as all or part of a certain terminal by means of software, hardware or a combination of software and hardware. The TV program identification system may include:

a video sampling module 410, for sampling a video to obtain an image to be identified;

an image sending module 420, for sending the image to be identified obtained by the video sampling module 410 through sampling to a server;

an image receiving module 310, for receiving the image to be identified obtained by a terminal by sampling the video;

an image detection module 320, for detecting in a prestored image library whether there is an image matching the image to be identified received by the image receiving module 310, where the image library includes images obtained by sampling respective programs;

a result feedback module 330, for, if a result detected by the image detection module 320 is that there is an image matching the image to be identified, adding a TV program identifier corresponding to the image matching the image to be identified to program information, and taking the program information as a TV program identification result of the video to be returned to the terminal; and a result receiving module 430, for receiving the program information returned by the server, where the program information is returned when the server detects that there is an image matching the image to be identified sent by the image sending module 420 in the prestored image library, adds a TV program identifier corresponding to the image matching the image to be identified to program information, and generates a TV program information record as a TV program identification result of the video, and the image library includes images obtained by sampling respective programs.

In sum, the TV program identification system according to this embodiment of the present application receives an image to be identified obtained by a terminal by sampling a video; detects in a prestored image library whether there is an image matching the image to be identified, where the image library includes images obtained by sampling respective programs; and if a detection result is that there is an image matching the image to be identified, adds a TV program identifier corresponding to the image matching the image to be identified to program information, and generates a TV program information record as a TV program identification result of the video to be returned to the terminal, and as a user definitely could obtain an image of a video through sampling while viewing the video and accuracy of the image obtained through sampling is higher, performing TV program identification according to the image to be identified obtained through sampling solves the problem that the user cannot acquire a keyword or a correct program cannot be identified and accuracy of TV program identification is reduced because a keyword acquired is wrong, which achieves the effect of improving the accuracy of TV program identification.

Figure 4:
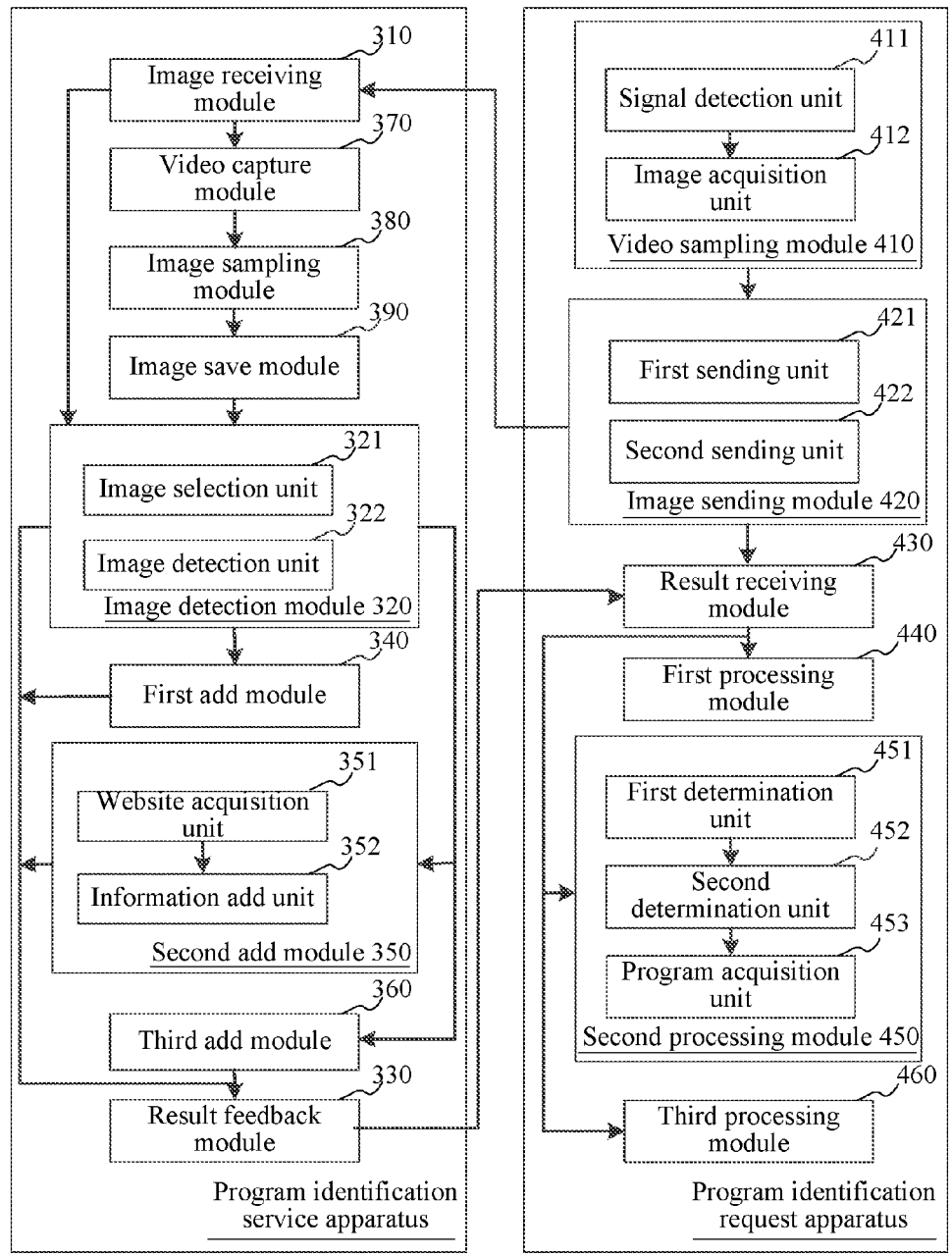
FIG. 4 is a schematic structural view of a TV program identification system according to another embodiment of the present application.

FIG. 4 is a schematic structural view of a TV program identification system according to another embodiment of the present application. The TV program identification system may include: a TV program identification service apparatus and a TV program identification request apparatus, where the TV program identification service apparatus may include an image receiving module 310, an image detection module 320 and a result feedback module 330, and the TV program identification service apparatus may be implemented as all or part of a certain server by means of software, hardware or a combination of software and hardware; the TV program identification request apparatus may include a video sampling module 410, an image sending module 420 and a result receiving module 430, and the TV program identification request apparatus may be implemented as all or part of a certain terminal by means of software, hardware or a combination of software and hardware. The TV program identification system may include:

a video sampling module 410, for sampling a video to obtain an image to be identified;

an image sending module 420, for sending the image to be identified obtained by the video sampling module 410 through sampling to a server;

an image receiving module 310, for receiving the image to be identified obtained by the terminal by sampling the video;

an image detection module 320, for detecting in a prestored image library whether there is an image matching the image to be identified received by the image receiving module 310, where the image library includes images obtained by sampling respective programs;

a result feedback module 330, for, if a result detected by the image detection module 320 is that there is an image matching the image to be identified, adding a TV program identifier corresponding to the image matching the image to be identified to program information, and taking the program information as a TV program identification result of the video to be returned to the terminal; and a result receiving module 430, for receiving the program information returned by the server, where the program information is returned when the server detects that there is an image matching the image to be identified sent by the image sending module 420 in the prestored image library, adds a TV program identifier corresponding to the image matching the image to be identified to program information, and generates a TV program information record as a TV program identification result of the video, and the image library includes images obtained by sampling respective programs.

Further, the TV program identification service apparatus also includes:

a first add module 340, for, before the result feedback module 330 generates a TV program information record as a TV program identification result of the video to be returned to the terminal, searching interactive information corresponding to the program identifier in a preset interactive information library, and adding the interactive information to the program information, where the interactive information is used for identifying an interactive activity of a program; and/or a second add module 350, for, before the result feedback module 330 generates a TV program information record as a TV program identification result of the video to be returned to the terminal, searching a playback link corresponding to the program identifier in a preset resource library, and adding the playback link to the program information.

In this embodiment, the TV program identification request apparatus also includes:

a first processing module 440, for, after the result receiving module 430 receives the TV program information record returned by the server, if the program information further includes interactive information corresponding to the program identifier, displaying the interactive information, and participating in an interactive activity identified by the interactive information when receiving a first operation signal acting upon the displayed interactive information; and a second processing module 450, for, after the result receiving module 430 receives the TV program information record returned by the server, if the program information further includes a playback link corresponding to the program identifier, displaying the playback link, and acquiring a program from the playback link when receiving a second operation signal acting upon the displayed playback link.

Specifically, the second add module 350 includes:

a website acquisition unit 351, for acquiring a website identifier of a source website of the playback link; and an information add unit 352, for adding the playback link and a correspondence relationship between the playback link and the website identifier acquired by the website acquisition unit 351 to the program information.

In this embodiment, if the program information also includes playback links and a correspondence relationship between the playback links and website identifiers of source websites of the playback links and the number of the website identifiers is at least two, the second processing module 450 includes:

a first determination unit 451, for receiving a select signal selecting a website identifier, and determining a website identifier to be selected according to the select signal;

a second determination unit 452, for determining a playback link corresponding to the selected website identifier selected by the first determination unit 451 according to the correspondence relationship; and a program acquisition unit 453, for acquiring a program from the playback link determined by the second determination unit 452.

Further, the TV program identification service apparatus further includes:

a third add module 360, for, before the result feedback module 330 generates a TV program information record as a TV program identification result to be returned to the terminal, setting a program list for programs whose playback time is after that of a program identified by a TV program identifier according to a predetermined policy, and adding the program list to the program information.

In this embodiment, the TV program identification request apparatus further includes:

a third processing module 460, for, after the result receiving module 430 receives the TV program information record returned by the server, if the program information further includes a program list set for programs whose playback time is after that of a program identified by a TV program identifier, displaying the program list.

Specifically, if the number of the image to be identified is at least two, the image detection module 320 includes:

an image selection unit 321, for selecting an image to be identified with a maximum identification parameter value from at least two images to be identified; and an image detection unit 322, for detecting in the image library whether there is an image matching the image to be identified selected by the image selection unit 321.

In this embodiment, if the number of the image to be identified is at least two, the image sending module 420 includes:

a first sending unit 421, for sending at least two images to be identified to the server; or a second sending unit 422, for selecting an image to be identified with a maximum identification parameter value from the at least two images to be identified, and sending the selected image to be identified to the server.

Further, the TV program identification service apparatus also includes:

a video capture module 360, for, before the image detection module 320 detects in a prestored image library whether there is an image matching the image to be identified, capturing a clip of video with a predetermined duration for each program, where the predetermined duration is ΔT and end time of the predetermined duration is current time T;

an image sampling module 370, for sampling each clip of video captured by the video capture module 360 to obtain an image; and an image save module 380, for saving the image obtained by the image sampling module 370 through sampling and a correspondence relationship between the image and a program into an image library.

Specifically, the video sampling module 410 includes:

a signal detection unit 411, for detecting whether a trigger signal has been received;

an image acquisition unit 412, for a result detected by the signal detection unit 411 is that a trigger signal has been received, invoking a camera to photograph playback images of the video, to obtain an image to be identified.

In sum, the TV program identification system according to this embodiment of the present application receives an image to be identified obtained by a terminal by sampling a video; detects in a prestored image library whether there is an image matching the image to be identified, where the image library includes images obtained by sampling respective programs; and if a detection result is that there is an image matching the image to be identified, adds a TV program identifier corresponding to the image matching the image to be identified to program information, and generates a TV program information record as a TV program identification result of the video to be returned to the terminal, and as a user definitely could obtain an image of a video through sampling while viewing the video and accuracy of the image obtained through sampling is higher, performing TV program identification according to the image to be identified obtained through sampling solves the problem that the user cannot acquire a keyword or a correct program cannot be identified and accuracy of TV program identification is reduced because a keyword acquired is wrong, which achieves the effect of improving the accuracy of TV program identification. In addition, by selecting an image to be identified with a maximum identification parameter value from at least two images to be identified and detecting in an image library whether there is an image matching the selected image to be identified, an image to be identified with a maximum identification parameter value may be selected in a different image identification manner, and as the greater the identification parameter value is, the better for image identification, the selected image to be identified is an image most suitable for TV program identification, which improves accuracy of the server's identification result for the image to be identified, and achieves the effect of further improving accuracy of TV program identification.

Figure 5:
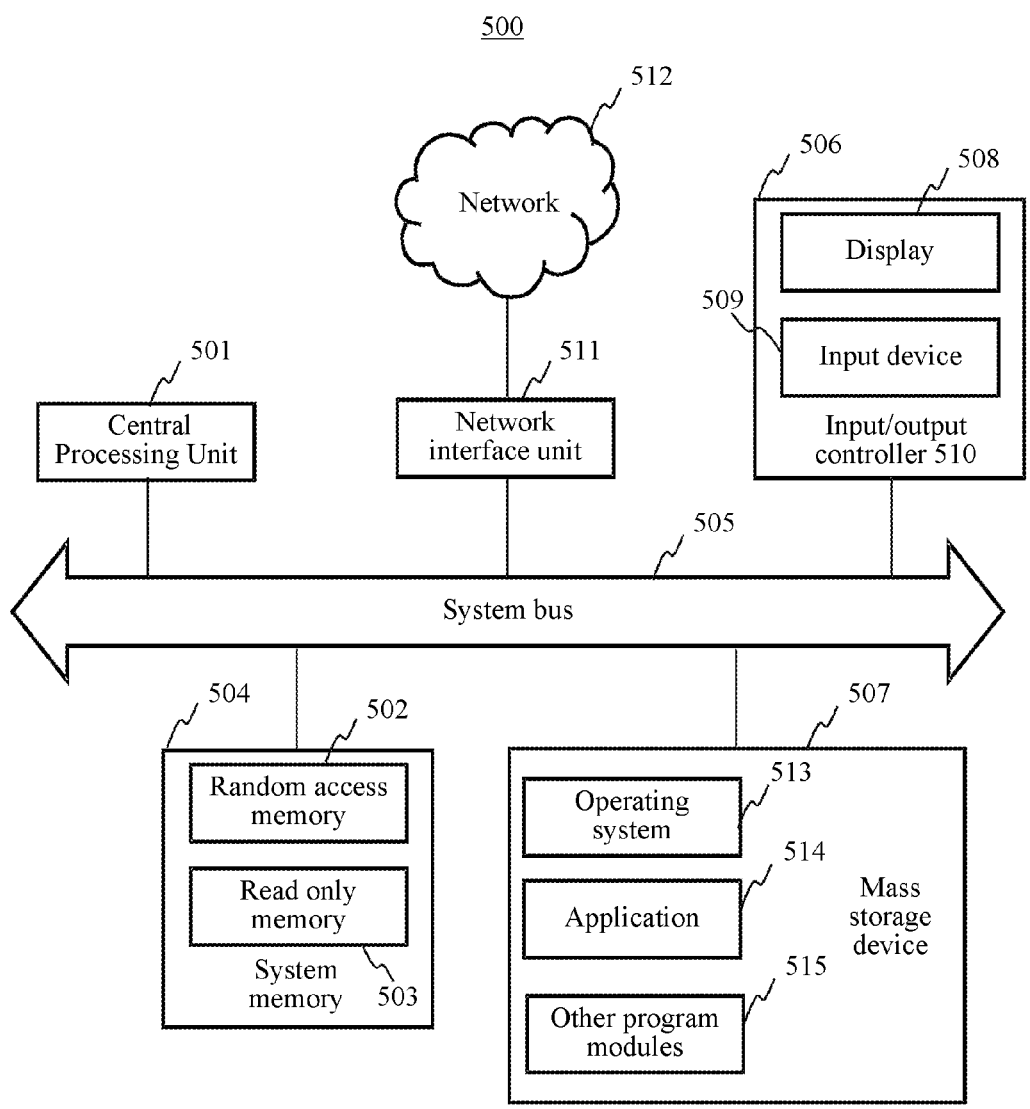
FIG. 5 is a schematic structural view of a server according to an embodiment of the present application.

FIG. 5 is a schematic structural view of a server according to an embodiment of the present application. The server 500 includes a Central Processing Unit (CPU) 501, a system memory 504 including a Random Access Memory (RAM) 502 and a Read Only Memory (ROM) 503, and a system bus 505 connecting the system memory 504 and the CPU 501. The server 500 also includes a basic input/output system (I/O system) 506 helping to transmit information between respective devices in a computer, and a mass storage device 507 for storing an operating system 513, an application 514 and other program modules 515. One exemplary application is to identify a TV program based on the images provided by a mobile terminal as described above in connection with FIGS. 1 and 2.

The basis I/O system 506 includes a display 508 for displaying information and an input device 509 for a user to input information, such as a mouse or a keyboard. The display 508 and the input device 509 are both connected to the CPU 501 through an I/O controller 510 connected to the system bus 505. The basis I/O system 506 also may include an I/O controller 510 for receiving and processing input from many other devices such as a keyboard, a mouse and an electronic stylus. Similarly, the I/O controller 510 also provides output to a display screen, a printer or other types of output devices.

The mass storage device 507 is connected to the CPU 501 through a mass storage controller (not shown) connected to the system bus 505. The mass storage device 507 and a computer readable medium associated therewith provide the server 500 with nonvolatile storage. That is to say, the mass storage device 507 may include a computer readable medium (not shown) such as a hard disk or a CD-ROM drive.

Without loss of generality, the computer readable medium may include a computer storage medium and a communication medium. The computer storage medium includes volatile or nonvolatile, removable and non-removable media achieved with any method or technology for storing information such as computer readable instructions, data structures, program modules or other data. The computer storage medium includes RAM, ROM, EPROM, EEPROM, flash memory or other solid-state storage technologies, CD-ROM, DVD or other optical storage, magnetic tape cassette, magnetic tape, magnetic disk storage or other magnetic storage devices. Certainly, persons skilled in the art may know that the computer storage medium is not limited to the above. The system memory 504 and the mass storage device 507 may be collectively referred to as a memory.

According to various embodiments of the present application, the server 500 also may operate by being connected to a remote computer on a network via Internet or other networks. That is, the server 500 may be connected to a network 512 via a network interface unit 511 connected to the system bus 505, or, it also may use the network interface unit 511 to be connected to other types of networks or remote computer systems (not shown).

The memory also includes one or more programs, and the one or more programs are stored in the memory, and are configured to be implemented through one or more CPUs 501. The one or more programs have the following functions:

receiving an image to be identified obtained by a terminal by sampling a video;

detecting in a prestored image library whether there is an image matching the image to be identified, where the image library includes images obtained by sampling respective programs; and if a detection result is that there is an image matching the image to be identified, adding a TV program identifier corresponding to the image matching the image to be identified to program information, and taking the program information as a TV program identification result of the video to be returned to a terminal.

Further, before taking the program information as a TV program identification result of the video to be returned to a terminal, further include:

searching interactive information corresponding to the program identifier in a preset interactive information library, and adding the interactive information to the program information, where the interactive information is used for identifying an interactive activity of a program; and/or searching a playback link corresponding to the program identifier in a preset resource library, and adding the playback link to the program information.

Specifically, adding the playback link to the program information includes:

acquiring a website identifier of a source website of the playback link; and adding the playback link and a correspondence relationship between the playback link and the website identifier to the program information.

Further, before taking the program information as a TV program identification result of the video to be returned to a terminal, further include:

setting a program list for programs whose playback time is after that of a program identified by a TV program identifier according to a predetermined policy, and adding the program list to the program information.

Specifically, if the number of the image to be identified is at least two, detecting in a prestored image library whether there is an image matching the image to be identified includes:

selecting an image to be identified with a maximum identification parameter value from at least two images to be identified; and detecting in the image library whether there is an image matching the selected image to be identified.

Further, before detecting in a prestored image library whether there is an image matching the image to be identified, further include:

capturing a clip of video with a predetermined duration for each program, where the predetermined duration is $\Delta T$ and end time of the predetermined duration is current time T;

sampling each clip of video to obtain an image; and saving the image and a correspondence relationship between the image and a program into an image library.

In sum, the server according to this embodiment of the present application receives an image to be identified obtained by a terminal by sampling a video; detects in a prestored image library whether there is an image matching the image to be identified, where the image library includes images obtained by sampling respective programs; and if a detection result is that there is an image matching the image to be identified, adds a TV program identifier corresponding to the image matching the image to be identified to program information, and generates a TV program information record as a TV program identification result of the video to be returned to the terminal, and as a user definitely could obtain an image of a video through sampling while viewing the video and accuracy of the image obtained through sampling is higher, performing TV program identification according to the image to be identified obtained through sampling solves the problem that the user cannot acquire a keyword or a correct program cannot be identified and accuracy of TV program identification is reduced because a keyword acquired is wrong, which achieves the effect of improving the accuracy of TV program identification. In addition, by selecting an image to be identified with a maximum identification parameter value from at least two images to be identified and detecting in an image library whether there is an image matching the selected image to be identified, an image to be identified with a maximum identification parameter value may be selected in a different image identification manner, and as the greater the identification parameter value is, the better for image identification, the selected image to be identified is an image most suitable for TV program identification, which improves accuracy of the server's identification result for the image to be identified, and achieves the effect of further improving accuracy of TV program identification.

Figure 6:
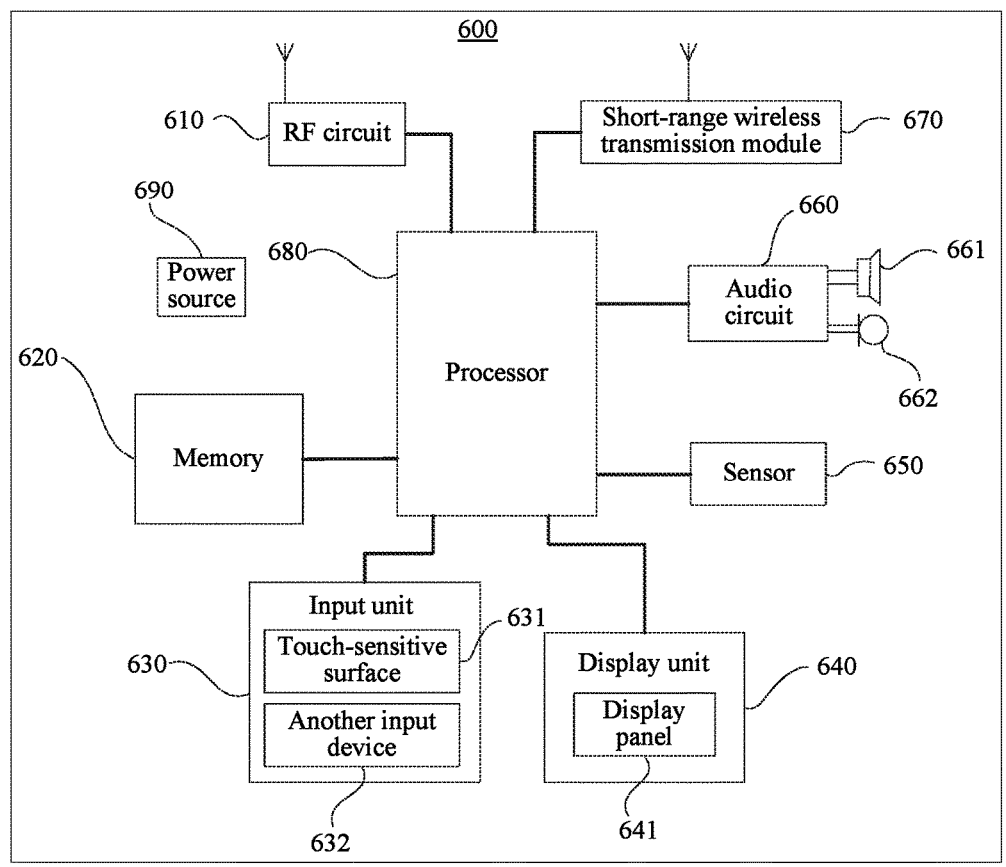
FIG. 6 is a schematic structural view of a terminal according to an embodiment of the present application.

FIG. 6 is a schematic structural view of a terminal according to an embodiment of the present application. The terminal is used for implementing the TV program identification method provided in the above embodiments. The terminal in this embodiment of the present application may include one or more following components: a processor for executing computer program instructions to perform various processes and methods, an RAM and an ROM for storing information and program instructions, a memory for storing data and information, a database for storing formats, directories or other data structures, an I/O device, an interface, an antenna and the like. Specifically:

The terminal 600 may include a radio frequency (RF) circuit 610, a memory 620 including one or more computer readable storage media, an input unit 630, a display unit 640, a sensor 650, an audio circuit 660, a short-range wireless transmission module 670, a processor 680 including one or more processing cores, a power source 690 and other components. Persons skilled in the art may understand that, the terminal structure shown in FIG. 6 does not limit the terminal, which may include components more or less than those illustrated, or combine some components, or have different component arrangements.

The RF circuit 610 may be used for receiving and sending signals during information receiving and sending or a call, particularly, after receiving downlink information of a base station, handing the downlink information over to one or more processors 680 for processing; and in addition, sending data involving uplink to the base station. Usually, the RF circuit 610 includes, but is not limited to, an antenna, at least one amplifier, a tuner, one or more oscillators, a Subscriber Identity Module (SIM) card, a transceiver, a coupler, a Low Noise Amplifier (LNA), a duplexer and the like. Besides, the RF circuit 610 also may communicate with other devices via wireless communication and a network. The wireless communication may use any communication standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), e-mails, Short Messaging Service (SMS) and the like.

The memory 620 may be used for storing software programs and modules. The processor 680 executes various functional applications and data processing by running the software programs and modules stored in the memory 620. The memory 620 may mainly include a program storage region and a data storage region, where the program storage region may store an operating system, an application required by at least one function (such as a voice playback function, or an image playback function); the data storage region may store data (such as audio data or a phone book)

created according to use of the terminal 600. For example, the application for obtaining images and/or audio samples and playing the TV programs as described above in connection with FIGS. 1 and 2 may be found in the program storage region and the obtained images and audio samples as well as the video downloaded from a remote server may be stored in the data storage region. In addition, the memory 620 may include a high-speed random access memory, and also may be a non-transitory computer readable storage medium including a nonvolatile memory, for example, at least one disk storage device, a flash memory device, or other volatile solid-state storage devices. Correspondingly, the memory 620 also may include a memory controller, to provide access of the processor 680 and the input unit 630 to the memory 620.

The input unit 630 may be used for receiving input numerical information or character information, and generating keyboard, mouse, joystick, optical or trackball signal input relevant to user setting and function control. Specifically, the input unit 630 may include a touch-sensitive surface 631 and another input device 632. The touch-sensitive surface 631, also referred to as a touch screen or a touch pad, may collect a user touch operation thereon or nearby (e.g., user operation on the touch-sensitive surface 631 or near the touch-sensitive surface 631 with a finger, a stylus, and any other suitable object or accessory), and drive a corresponding connection device according to a preset program. Optionally, the touch-sensitive surface 631 may include a touch detection device and a touch controller. The touch detection device detects a position touched by the user, detects a signal brought about by the touch operation, and transmits the signal to the touch controller; the touch controller receives touch information from the touch detection device, converts it into a contact coordinate, and then sends the contact coordinate to the processor 680, and further may receive a command sent by the processor 680 and execute the command. In addition, the touch-sensitive surface 631 may be implemented with multiple types such as resistive, capacitive, infrared, and surface acoustic wave types. In addition to the touch-sensitive surface 631, the input unit 630 may also include another input device 632. Specifically, the another input device 632 may include, but is not limited to, one or more of a physical keyboard, a function key (such as a volume control key or a switch key), a trackball, a mouse, and a joystick.

The display unit 640 may be used for displaying information input by the user or information provided for the user and various graphical user interfaces of the terminal 600, where the graphical user interfaces may be formed by graphics, texts, icons, videos, or any combination thereof. The display unit 640 may include a display panel 641, and optionally, the display panel 641 may be configured in forms such as a Liquid Crystal Display (LCD) or an Organic Light-Emitting Diode (OLED). Further, the touch-sensitive surface 631 may cover the display panel 641, and after detecting the touch operation thereon or nearby, the touch-sensitive surface 631 transmits it to the processor 680 to determine the type of the touch event, and then the processor 680 provides corresponding visual output on the display panel 641 according to the type of the touch event. Although in FIG. 6, the touch-sensitive surface 631 and the display panel 641 implement input and input functions as two separate members, in some embodiments, the touch-sensitive surface 631 and the display panel 641 may be integrated to implement input and output functions.

The terminal 600 also may include at least one sensor 650, for example, an optical sensor, a motion sensor, and other sensors (e.g., an image sensor for taking pictures of a TV program played on a TV as shown in FIG. 2B). Specifically, the optical sensor may include an ambient light sensor and a proximity sensor, where the ambient light sensor may adjust brightness of the display panel 641 according to brightness of ambient light, and the proximity sensor may close the display panel 641 and/or backlight when the terminal 600 moves to the ear. As one kind of the motion sensor, a gravity accelerometer may detect the size of acceleration in various directions (generally triaxial), may detect the size and direction of gravity in the stationary state, and may be used for identifying applications of a phone posture (such as horizontal and vertical screen switching, related games, or magnetometer posture calibration), may vibrate to identify relevant functions (for example, a pedometer, or tapping) and the like; other sensors such as a gyroscope, a barometer, a hygrometer, a thermometer, and an infrared sensor that may be configured on the terminal 600 are not repeated herein.

An audio circuit 660, a loudspeaker 661. and a microphone 662 may provide an audio interface between the user and the terminal 600. The audio circuit 660 may convert received audio data into an electric signal, and then transmit the electric signal to the loudspeaker 661; and the loudspeaker 661 converts the electric signal into a sound signal for output. On the other hand, the microphone 662 converts the collected sound signal into an electric signal (e.g., generating audio samples from a TV program played on a TV as shown in FIG. 2B), and the audio circuit 660 receives the electric signal and then converts it into audio data; after being output to the processor 680 for processing, the audio data is sent to, for example, another terminal via the RF circuit 610, or the audio data is output to the memory 620 for further processing. The audio circuit 660 may further include an earplug jack, to provide communication between a peripheral headset and the terminal 600.

The short-range wireless transmission module 670 may be a wireless fidelity (Wi-Fi) module, a Bluetooth module or the like. The terminal 600 may help the user to send and receive an e-mail, browse webpages and access streaming media through the short-range wireless transmission module 670, which provides wireless broadband Internet access for the users. Although FIG. 6 shows the short-range wireless transmission module 670, but it may be understood that, the short-range wireless transmission module 670 is not a necessary component of the terminal 600, and may be completely saved without changing the essential scope of the invention as required.

The processor 680 is a control center of the terminal 600, uses various interfaces and lines to connect various parts of the whole mobile phone, and executes various functions of the terminal 600 and processes data by running or executing software programs and/or modules stored in the memory 620, and invoking data stored in the memory 620, thereby monitoring the mobile phone as a whole. Optionally, the processor 680 may include one or more processing cores; optionally, the processor 680 may integrate an application processor and a modem processor, where the application processor mainly processes the operating system, user interfaces and applications, and the modem processor mainly processes wireless communication. It may be understood that, the modem processor may not be integrated into the processor 680.

The terminal 600 may also include a power source 690 (e.g., a battery) supplying power for various parts, and preferably, the power source may be logically connected with the processor 680 through a power management system, so as to achieve functions of managing charging, discharging, and power management through the power management system. The power source 690 may also include any component such as one or more DC or AC power sources, a recharging system, a power failure detection circuit, a power converter or inverter, or a power status indicator.

Although not shown, the terminal 600 may also include a camera, a Bluetooth module and the like, which is not repeated herein. Specifically, in this embodiment, the display unit of the terminal 600 is a touch screen display.

In addition to one or more processors 680, the terminal 600 may include a memory and one or more programs, where the one or more programs are stored in the memory, and are configured to be implemented through one or more processors. The one or more programs have the following functions: sampling a video to obtain an image to be identified; sending the image to be identified to a server; and receiving program information returned by the server, where the program information is returned by the server when detecting that there is an image matching the image to be identified in a prestored image library, adding a TV program identifier corresponding to the image matching the image to be identified, and taking the program information as a TV program identification result of the video, and the image library includes images obtained by sampling respective programs.

Further, after receiving program information returned by the server, also include: if the program information further includes interactive information corresponding to the program identifier, displaying the interactive information, and participating in an interactive activity identified by the interactive information when receiving a first operation signal acting upon the displayed interactive activity; and if the program information further includes a playback link corresponding to the program identifier, displaying the playback link, and acquiring a program from the playback link when receiving a second operation signal acting upon the displayed playback link.

Specifically, if the program information also includes playback links and a correspondence relationship between the playback links and website identifiers of source websites of the playback links and the number of the website identifiers is at least two, acquiring a program from the playback link includes: receiving a select signal selecting a website identifier, and determining a website identifier to be selected according to the select signal; determining a playback link corresponding to the selected website identifier according to the correspondence relationship; and acquiring a program from the determined playback link.

Further, after receiving program information returned by the server, also include: if the program information further includes a program list set for programs whose playback time is after that of a program identified by a TV program identifier, displaying the program list.

Specifically, if the number of the image to be identified is at least two, sending the image to be identified to a server includes: sending at least two images to be identified to the server; or selecting an image to be identified with a maximum identification parameter value from at least two images to be identified, and sending the selected image to be identified to the server.

Specifically, sampling a video to obtain an image to be identified includes: detecting whether a trigger signal has been received; and if a detection result is that a trigger signal has been received, invoking a camera to photograph playback images of the video, to obtain an image to be identified.

In sum, the terminal according to this embodiment of the present application obtains an image to be identified by sampling a video; sends the image to be identified to a server; and receives program information returned by the server, where the program information is returned by the server when detecting that there is an image matching the image to be identified in a prestored image library, adding a TV program identifier corresponding to the image matching the image to be identified, and taking the program information as a TV program identification result of the video, and the image library includes images obtained by sampling respective programs, and as a user definitely could obtain an image of a video through sampling while viewing the video and accuracy of the image obtained through sampling is higher, performing TV program identification according to the image to be identified obtained through sampling solves the problem that the user cannot acquire a keyword or a correct program cannot be identified and accuracy of TV program identification is reduced because a keyword acquired is wrong, which achieves the effect of improving the accuracy of TV program identification. In addition, by selecting an image to be identified with a maximum identification parameter value from at least two images to be identified and sending the selected image to be identified to the server, an image to be identified with a maximum identification parameter value may be selected in a different image identification manner, and as the greater the identification parameter value is, the better for image identification, the selected image to be identified is an image most suitable for TV program identification, which improves accuracy of the server's identification result for the image to be identified, and achieves the effect of further improving accuracy of TV program identification.

Figure 7:
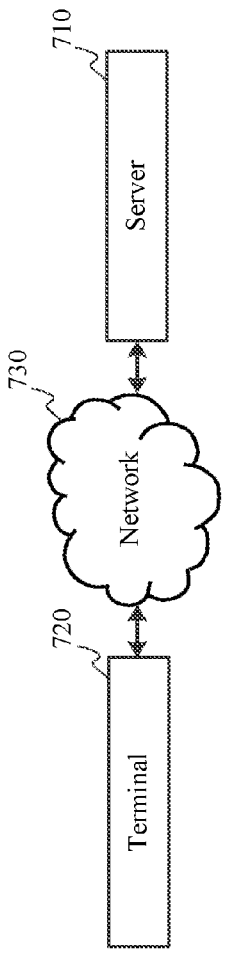
FIG. 7 is a schematic structural view of a TV program identification system according to an embodiment of the present application.

FIG. 7 is a schematic structural view of a TV program identification system according to an embodiment of the present application. The program interaction system may include: a server 710 and a terminal 720; the server 710 and the terminal 720 may be connected via a wired network or a wireless network 730; the server 710 may be the server shown in FIG. 3, and the terminal 720 may be the terminal in FIG. 3; or the server 710 may be the server shown in FIG. 4, and the terminal 720 may be the terminal in FIG. 4; or the server 710 may be the server shown in FIG. 5, and the terminal 720 may be the terminal in FIG. 6.

In sum, the program interaction system according to this embodiment of the present application receives an image to be identified obtained by a terminal by sampling a video; detects in a prestored image library whether there is an image matching the image to be identified, where the image library includes images obtained by sampling respective programs; and if a detection result is that there is an image matching the image to be identified, adds a TV program identifier corresponding to the image matching the image to be identified to program information, and generates a TV program information record as a TV program identification result of the video to be returned to the terminal, and as a user definitely could obtain an image of a video through sampling while viewing the video and accuracy of the image obtained through sampling is higher, performing TV program identification according to the image to be identified obtained through sampling solves the problem that the user cannot acquire a keyword or a correct program cannot be identified and accuracy of TV program identification is reduced because a keyword acquired is wrong, which achieves the effect of improving the accuracy of TV program identification. In addition, by selecting an image to be identified with a maximum identification parameter value from at least two images to be identified and detecting in an image library whether there is an image matching the selected image to be identified, an image to be identified with a maximum identification parameter value may be selected in a different image identification manner, and as the greater the identification parameter value is, the better for image identification, the selected image to be identified is an image most suitable for TV program identification, which improves accuracy of the server's identification result for the image to be identified, and achieves the effect of further improving accuracy of TV program identification.

It should be noted that, the TV program identification service apparatus, the TV program identification request apparatus and the TV program identification system according to the above embodiments are only illustrated with division of the above functional modules when performing TV program identification, and in actual applications, the above functions are assigned to different functional modules for completion according to requirements, that is, internal structures of the TV program identification service apparatus, the TV program identification request apparatus and the TV program identification system are divided into different functional modules, so as to perform all or part of the functions described above. In addition, the TV program identification service apparatus, the TV program identification request apparatus and the TV program identification system according to the above embodiments belong to the same concept as the embodiment of the TV program identification method, and reference may be made to the method embodiment for specific implementation thereof, which is not repeated herein.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for retrieving and playing a TV program using a mobile terminal, the method comprising:
    at a mobile terminal having one or more processors, memory storing program modules to be executed by the one or more processors, an image sensor, and a display:
        capturing one or more images of a TV program currently played on a TV using the image sensor;
        sending the images to a remote server, wherein the server is configured to extract a TV station identifier from the received images, compare the received images with images stored in an image library and corresponding to the TV station identifier, and determine an identity of the TV program when there is a match between the received images and the images stored in the image library, and generate an information record for the TV program;
        receiving the TV program information record including a hyperlink to the TV program from the remote server;
        displaying the hyperlink on the display of the mobile terminal and TV program interactive information adjacent to the hyperlink;
        in response to a user selection of the hyperlink, playing the TV program on the display of the mobile terminal; and
        in response to a user selection of the TV program interactive information, updating the play of the TV program on the display of the mobile terminal.

2. The method of claim 1, wherein the TV program information record further includes a timestamp indicating when the images of the TV program were obtained, the method further comprising:
    in response to a user selection of the hyperlink, playing a portion of the TV program on the display of the mobile terminal starting from the timestamp.

3. The method of claim 1, wherein the TV program information record further includes a second hyperlink to a second copy of the TV program located at a second source, the method further comprising:
    displaying the second hyperlink on the display of the mobile terminal; and in response to a user selection of the second hyperlink, retrieving the second copy of the TV program from the second source and playing the TV program on the display of the mobile terminal.

4. The method of claim 1, wherein the TV program information record further includes a third hyperlink to another TV program associated with the TV program currently played on the TV, the method further comprising:
displaying the third hyperlink on the display of the mobile terminal; and
in response to a user selection of the third hyperlink, playing the another TV program on the display of the mobile terminal.

5. The method of claim 1, further comprising:
obtaining an audio sample of the TV program while obtaining the images; and
sending the audio sample and the images to the remote server so that the remote server can determine the identity of the TV program using both the audio sample and the images.

6. A method for identifying a TV program, the method comprising:
at a server having one or more processors and memory storing program modules to be executed by the one or more processors:
receiving one or more images from a mobile terminal, wherein the one or more images are captured from a TV program being played on a TV using an image sensor of the mobile terminal;
comparing the received images with images stored in an image library, wherein each image in the image library corresponds to a unique TV program identifier, a TV station identifier is extracted from the received images, and the received images are compared with the images stored in the image library and corresponding to the TV station identifier to determine whether there is a match;
in accordance with a determination that there is a match between the received images and at least one of the images in the image library, identifying a TV program identifier corresponding to the received images and generating a TV program information record associated with the TV program identifier, the TV program information record including a hyperlink; and
returning the TV program information record to the mobile terminal, wherein the mobile terminal is configured to play the TV program in response to a user selection of the hyperlink, display TV program interactive information adjacent to the hyperlink, and update the play of the TV program in response to a user selection of the TV program interactive information.

7. The method of claim 6, further comprising:
receiving an audio sample associated with the one or more images from the mobile terminal;
comparing the received audio sample with data samples stored in an audio library, wherein each data sample in the audio library corresponds to a unique TV program identifier to determine a TV program identifier corresponding to the received audio sample; and
returning the TV program record if the TV program identifier corresponding to the received audio sample is the same as the TV program identifier corresponding to the received images.

8. The method of claim 6, wherein the TV program information record includes a second hyperlink to a second copy of the TV program at a second source, wherein the second hyperlink is displayed on the mobile terminal along with the hyperlink as an alternative choice for playing the TV program on the mobile terminal.

9. The method of claim 6, wherein the TV program information record includes a third hyperlink to another TV program associated with the TV program, wherein the third hyperlink is displayed on the mobile terminal along with the hyperlink so that a user can select the third hyperlink to watch the another TV program on the mobile terminal.

10. The method of claim 6, wherein the image library maintains a set of images extracted from a video segment broadcast by a TV station within a predefined time window from present and associated the set of images with a TV program identifier and the time window.

11. A server system, comprising:
one or more processors;
memory; and
one or more program modules stored in the memory and to be executed by the one or more processors, the program modules further including instructions for:
receiving one or more images from a mobile terminal, wherein the one or more images are captured from a TV program being played on a TV using an image sensor of the mobile terminal;
comparing the received images with images stored in an image library, wherein each image in the image library corresponds to a unique TV program identifier, a TV station identifier is extracted from the received images, and the received images are compared with the images stored in the image library and corresponding to the TV station identifier to determine whether there is a match;
in accordance with a determination that there is a match between the received images and at least one of the images in the image library, identifying a TV program identifier corresponding to the received images and generating a TV program information record associated with the TV program identifier, the TV program information record including a hyperlink; and
returning the TV program information record to the mobile terminal, wherein the mobile terminal is configured to play the TV program in response to a user selection of the hyperlink, display TV program interactive information adjacent to the hyperlink, and update the play of the TV program in response to a user selection of the TV program interactive information.

12. The server system of claim 11, wherein the program modules further include instructions for:
receiving an audio sample associated with the one or more images from the mobile terminal;
comparing the received audio sample with data samples stored in an audio library, wherein each data sample in the audio library corresponds to a unique TV program identifier to determine a TV program identifier corresponding to the received audio sample; and
returning the TV program record if the TV program identifier corresponding to the received audio sample is the same as the TV program identifier corresponding to the received images.

13. The server system of claim 11, wherein the TV program information record includes a second hyperlink to a second copy of the TV program at a second source, wherein the second hyperlink is displayed on the mobile terminal along with the hyperlink as an alternative choice for playing the TV program on the mobile terminal.

14. The server system of claim 11, wherein the TV program information record includes a third hyperlink to another TV program associated with the TV program, wherein the third hyperlink is displayed on the mobile terminal along with the hyperlink so that a user can select the third hyperlink to watch the another TV program on the mobile terminal.

15. The server system of claim 11, wherein the image library maintains a set of images extracted from a video segment broadcast by a TV station within a predefined time window from present and associated the set of images with a TV program identifier and the time window.

* * * * *